(12) United States Patent
Fujita et al.

(10) Patent No.: US 7,907,241 B2
(45) Date of Patent: Mar. 15, 2011

(54) LIQUID CRYSTAL DISPLAY DEVICE

(75) Inventors: Kenji Fujita, Toyama (JP); Takayuki Natsume, Matsusaka (JP); Tetsuya Inoue, Yao (JP); Takahiro Oka, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 10 days.

(21) Appl. No.: 12/085,971

(22) PCT Filed: Aug. 30, 2006

(86) PCT No.: PCT/JP2006/317068
§ 371 (c)(1),
(2), (4) Date: May 12, 2009

(87) PCT Pub. No.: WO2007/063629
PCT Pub. Date: Jun. 7, 2007

(65) Prior Publication Data
US 2009/0219472 A1 Sep. 3, 2009

(30) Foreign Application Priority Data
Dec. 2, 2005 (JP) .................................. 2005-350019

(51) Int. Cl.
*G02F 1/1335* (2006.01)
(52) U.S. Cl. .......................... 349/114; 349/113; 349/117
(58) Field of Classification Search ........................ None
See application file for complete search history.

(56) References Cited

U.S. PATENT DOCUMENTS

| | | | |
|---|---|---|---|
| 6,067,138 A | 5/2000 | Nishiguchi et al. | |
| 6,356,324 B1 | 3/2002 | Nishiguchi et al. | |
| 6,512,561 B1 | 1/2003 | Terashita et al. | |
| 6,862,058 B2 | 3/2005 | Ikeno et al. | |
| 7,072,019 B1 | 7/2006 | Kishimoto | |
| 7,218,363 B2 | 5/2007 | Ozawa | |
| 7,339,643 B2 * | 3/2008 | Roosendaal et al. | 349/117 |
| 2001/0024257 A1 | 9/2001 | Kubo et al. | |
| 2003/0038909 A1 | 2/2003 | Ikeno et al. | |
| 2003/0058393 A1 | 3/2003 | Terashita et al. | |
| 2003/0189684 A1 | 10/2003 | Kuntz et al. | |

(Continued)

FOREIGN PATENT DOCUMENTS
EP 0 899 605 3/1999

(Continued)

OTHER PUBLICATIONS

International Search Report for PCT/JP2006/317068 mailed Nov. 21, 2006.

*Primary Examiner* — Tina M Wong
(74) *Attorney, Agent, or Firm* — Nixon & Vanderhye, P.C.

(57) ABSTRACT

To provide a liquid crystal display device capable of improving display characteristics. The liquid crystal display device of the present invention is a liquid crystal display device including a structure in which the first substrate including a reflective layer, a liquid crystal layer, the second substrate, and a polarizer are stacked in this order from a back face to a display face, wherein the liquid crystal display device includes a retardation layer, in a region on a liquid crystal layer side of the reflective layer of the first substrate, or in a region where the reflective layer is not arranged of the first substrate, or in the second substrate, and the retardation layer provides two or more regions having different retardations in a display surface plane.

3 Claims, 8 Drawing Sheets

U.S. PATENT DOCUMENTS

| | | |
|---|---|---|
| 2004/0004681 A1 | 1/2004 | Ozawa et al. |
| 2004/0105059 A1* | 6/2004 | Ohyama et al. ............... 349/114 |
| 2005/0140863 A1* | 6/2005 | Ha ................................. 349/113 |
| 2005/0174528 A1 | 8/2005 | Kubo et al. |
| 2006/0187387 A1 | 8/2006 | Ohyama et al. |
| 2006/0187388 A1* | 8/2006 | Ohyama et al. ............... 349/114 |
| 2007/0211198 A1* | 9/2007 | Nagai et al. ................... 349/114 |
| 2008/0273149 A1* | 11/2008 | Jeng et al. ..................... 349/114 |

FOREIGN PATENT DOCUMENTS

| | | |
|---|---|---|
| EP | 1 286 204 | 2/2003 |
| EP | 1 336 874 | 8/2003 |
| JP | 8-334614 | 12/1996 |
| JP | 9-054212 | 2/1997 |
| JP | 10-068816 | 3/1998 |
| JP | 2000-19518 | 1/2000 |
| JP | 2001-75104 | 3/2001 |
| JP | 2002-55343 | 2/2002 |
| JP | 2003-66473 | 3/2003 |
| JP | 2003-251643 | 9/2003 |
| JP | 2003-322857 | 11/2003 |
| JP | 2004-4494 | 1/2004 |

* cited by examiner (a)

(b)

LIQUID CRYSTAL DISPLAY DEVICE

This application is the U.S. national phase of International Application No. PCT/JP2006/317068 filed 30 Aug. 2006 which designated the U.S. and claims priority to Japanese Patent Application No. 2005-350019 filed 2 Dec. 2005, the entire contents of each of which are hereby incorporated by reference.

TECHNICAL FIELD

The present invention relates to a liquid crystal display device. More specifically, the present invention relates to a liquid crystal display device preferably used in a cellular phone, a personal digital assistance (PDA), and the like.

BACKGROUND ART

A liquid crystal display device has been used in various fields because of its characteristics such as thinness, light weight, and low power consumption. The liquid crystal display device includes a liquid crystal cell between two polarizers and performs display by converting change in alignment state of liquid crystal molecules by an electric field, into change in viewing angle, utilizing polarization. Accordingly, the polarization degree or light transmittance of the polarizers directly influences display qualities of the liquid crystal display device, such as contrast and luminance.

For example, in a Vertical Alignment (VA) mode liquid crystal display device, if only transmissive display is performed, a linear polarizer that transmits only light oscillating in a certain direction (linear polarization) is used as the polarizer. As the linear polarizer, for example, a polarizer composed of a linear polarizing element, or one including a linear polarizing element and a retardation film having a negative biaxial refractive index ellipsoid is disclosed (for example, refer to Patent Document 1). According to the latter configuration in which the linear polarizer includes a retardation film having a negative biaxial refractive index ellipsoid, viewing angle dependence of the linear polarizing element and viewing angle dependence of vertically aligning liquid crystal molecules can be compensated. As a result, display qualities can be improved.

However, the used of the linear polarizer makes it impossible for the device to perform reflective display (display performed by reflecting light entering the liquid crystal display device by a reflector in a liquid crystal cell) if transmissive display and reflective display are simultaneously performed. That is, if the reflective display is performed using the linear polarizer, white display is performed when no voltage or a voltage lower than a threshold voltage is applied and black display is performed when a voltage higher than a threshold voltage is applied in principle (display in normally white mode). Accordingly, the contrast ratio and the viewing angle are drastically reduced under strong external light.

Accordingly, in order to perform the reflective display, a circular polarizer composed of a linear polarizing element and at least one λ/4 retardation plate needs to be arranged on both sides (for example, refer to Patent Document 2). The λ/4 retardation plate produces a retardation of λ/4 between two polarization components oscillating in mutually perpendicular directions of transmissive light having a wavelength of λ. The use of the λ/4 retardation plate permits reflective display in normally black mode. Therefore, the contrast ratio and the viewing angle can be secured. In addition, a liquid crystal display device having a multi-gap structure and the like is disclosed as one capable of reducing optical loss in the reflective region.

However, in the circular polarizer, the absorption axis of the linear polarizing element is not parallel or perpendicular to the phase delay axis of the λ/4 retardation plate. Generally, the above-mentioned absorption axis needs to make an angle of substantially 45° or 135° with the phase delay axis. Therefore, the polarization degree in the circular polarizer is smaller than that in the linear polarizer. In addition, the circular polarizer is arranged not only in the reflective region but also in the transmissive region. Therefore, due to the use of the circular polarizer, the contrast ratio in the transmissive display is reduced, and the change in leaking light amount relative to change in viewing angle becomes large. In this point, such a liquid crystal display device has room for improvement. In addition, if the λ/4 retardation plate is used, uneven luminance is easily generated by a change in retardation under a high-temperature condition. Also in this point, such a liquid crystal display device has room for improvement.

Further, the circular polarizer (including an elliptical polarizer) needs to have controlled retardation wavelength dispersion characteristics, specifically, to show characteristics not changed depending on a wavelength, in order to prevent discoloration. In order to obtain such a broadband circular polarizer, a plurality of retardation plates are used together (for example, refer to Patent Document 4). In such a case, parameters of the respective retardation plates vary due to production reasons, which causes a further reduction in the contrast ratio in the transmissive display and which is disadvantageous in terms of productivity or cost in comparison to the case where the reflective display is not performed. In this point, there is room for improvement.

A liquid crystal display element including a retardation film composed of a polymerizable liquid crystal material, in which the retardation film provides retardations different between a region corresponding to liquid crystal between two substrates and a region corresponding to a reinforcing member (for example, refer to Patent Document 5). However, this liquid crystal display element aims at preventing a phenomenon in which a color tone in the display panel is different between a high molecule part and a liquid crystal part, having different optical properties. In this retardation film, only the retardation is controlled by a film thickness or a tilt angle of a liquid crystal molecule that is a polymerizable liquid crystal material. Therefore, this retardation film is not enough for the case where a retardation film having different optic axis directions between the transmissive region and the reflective region needs to be arranged. In this point, the liquid crystal display element has room for improvement.

In addition, a liquid crystal display device including a color film constituted of a double refraction film presenting coloring by a polarization interference, also presenting coloring in two or more colors by a variance of a retardation and where respective colored areas are distributed in a prescribed pattern state, on the outside or inside of a liquid crystal cell is disclosed (for example, refer to Patent Document 6).

Further, a manufacturing method for an anisotropic polymer film, including a step of coating a polymerizable liquid crystal or mesogenic material on a substrate having a texturized surface, a step of arranging the material, and a step of polymerizing the material is disclosed (for example, refer to Patent Document 7).

[Patent Document 1]
Japanese Kokai Publication No. 2000-19518
[Patent Document 2]
Japanese Kokai Publication No. 2002-55343
[Patent Document 3]
Japanese Kokai Publication No. 2001-75104

[Patent Document 4]
Japanese Kokai Publication No. Hei-10-68816
[Patent Document 5]
Japanese Kokai Publication No. Hei-09-54212
[Patent Document 6]
Japanese Kokai Publication No. Hei-08-334614
[Patent Document 7]
Japanese Kokai Publication No. 2003-251643

BRIEF DESCRIPTION OF DRAWINGS

FIG. 1-2 is a cross-sectional view schematically showing a configuration of cross-sections of the liquid crystal display device in FIG. 1-1, taken along lines A-B, C-D, and E-F, the cross-sections being connected in this order from the left to the right side.

FIG. 2-1 is a diagram showing one example of spectroscopic characteristics of the color layer 42R.

FIG. 2-2 is a diagram showing one example of spectroscopic characteristics of the color layer 42G.

FIG. 2-3 is a diagram showing one example of spectroscopic characteristics of the color layer 42B.

FIG. 3 is a cross-sectional view schematically showing a configuration of the liquid crystal display device in accordance with example Embodiment 2.

SUMMARY

Figure 1:
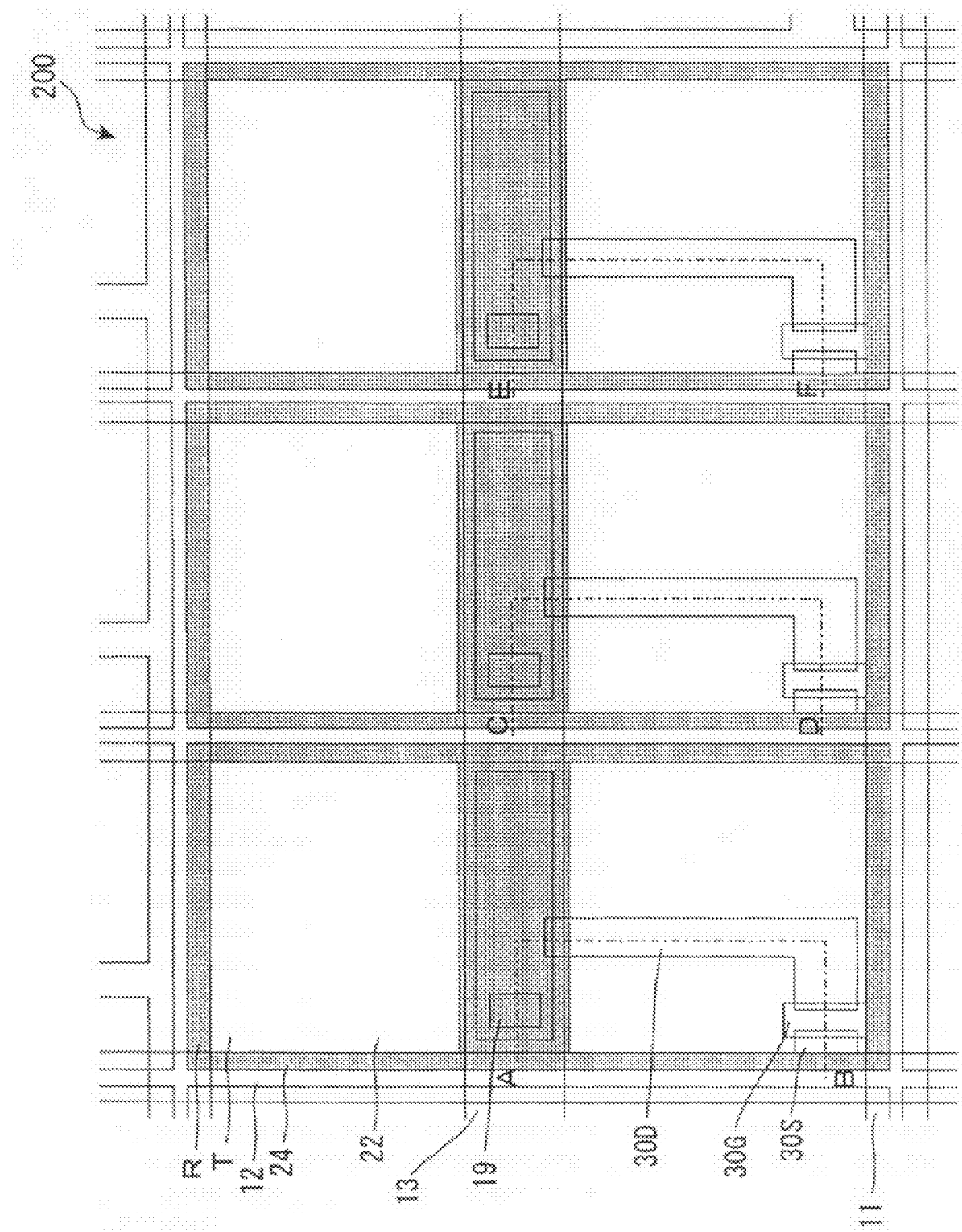
FIG. 1-1 is a plane view schematically showing a configuration of the liquid crystal display device in accordance with example Embodiment 1.

The technology disclosed herein has been made in view of the above-mentioned state of the art. The technology disclosed herein has an object to provide a liquid crystal display device capable of improving display characteristics.

The present inventors made various investigations on a liquid crystal display device having a structure in which the first substrate including a reflective layer, a liquid crystal layer, the second substrate, and a polarizer are stacked in this order from the back surface to the display surface. The inventors noted that if the above-mentioned liquid crystal display device includes regions having different display modes, optimal retardation compensation varies depending on the regions. For example, if the above-mentioned liquid crystal display device includes a reflective region where a reflective layer is formed and a transmissive region where a reflective layer is not arranged, the display mode is different between the reflective region and the transmissive region. Therefore, the optimal retardation compensation is different between the reflective region and the transmissive region. For example, if the above-mentioned liquid crystal display device include the first and second color layers having different dominant wavelengths in the region on the liquid crystal layer side of the reflective layer, light used for display in the reflective region where the first color layer is arranged and light used for display in the reflective region where the second color layer is arranged differ in wavelength. Therefore, between the two reflective regions, the optimal retardation compensation differs.

Then, the inventors found that if a retardation layer is arranged, in the region on the liquid crystal layer side of the reflective layer of the first substrate, or in the region where the reflective layer is not formed of the first substrate, or in the second substrate, and using this retardation layer, two or more regions having different retardations are provided in the display surface plane, for example, the retardation optimal for the reflective region and the one optimal for the transmissive region can be compensated, or the retardation optimal for the reflective region where the first color layer is arranged and the one optimal for the reflective region where the second color layer is arranged can be compensated. Thereby, the display characteristics can be improved. As a result, the above-mentioned problems could be admirably solved, leading to completion of the technology disclosed herein.

That is, the technology disclosed herein is a liquid crystal display device including a structure in which a first substrate including a reflective layer, a liquid crystal layer, a second substrate, and a polarizer are stacked in this order from a back face to a display face, wherein the liquid crystal display device includes a retardation layer, in a region on a liquid crystal layer side of the reflective layer of the first substrate, or in a region where the reflective layer is not arranged of the first substrate, or in the second substrate, and the retardation layer provides two or more regions having different retardations in a display surface plane.

The liquid crystal display device of the technology disclosed herein has a structure in which the first substrate including a reflective layer, the liquid crystal layer, the second substrate, and the polarizer are stacked in this order from the back face to the display face. In the present description, the part where the above-mentioned first substrate, the above-mentioned liquid crystal layer, and the above-mentioned second substrate are stacked in this order from the back face to the display face is also referred to as a liquid crystal cell. The above-mentioned liquid crystal display device can perform reflective display because the above-mentioned first substrate includes a reflective layer. The above-mentioned reflective layer may be arranged in the entire region of each pixel if only reflective display is performed. However, it is preferable that the reflective layer is partially arranged in each pixel if both of the reflective display and the transmissive display are performed. That is, the above-mentioned liquid crystal display device may be a reflective liquid crystal display device which performs only reflective display. However, it is preferable that the above-mentioned liquid crystal display device is a transflective (reflective-transmissive) liquid crystal display device which performs both of the transmissive display and the reflective display. It is preferable that the above-mentioned reflective layer has an uneven surface in order to perform bright reflective display using surrounding light with efficiency. The above-mentioned reflective layer may have conductivity and may serve as an electrode (reflective electrode) facing an electrode in the second substrate with the liquid crystal layer therebetween as long as the reflective layer can reflect light. A high-reflective metal such as aluminum (Al) is preferably used as the material for the above-mentioned reflective layer.

The above-mentioned liquid crystal display device includes a retardation layer, in the region on the liquid crystal layer side of the reflective layer of the first substrate, or in the region where the reflective layer is not arranged of the first substrate, or in the second substrate. The retardation layer provides two or more regions having different retardations in a display surface plane. If the above-mentioned retardation layer is arranged in a reflective region where the reflective layer is arranged of the first or second substrate, in that reflective region, the retardation layer can compensate the retardation. If the case where the above-mentioned first or second substrate has a transmissive region where the reflective layer is not arranged, in that transmissive region, the retardation layer can compensate the retardation if arranged in the transmissive region of the first or second substrate. The above-mentioned retardation layer is arranged in the first or second substrate, that is, in the liquid crystal cell. Therefore, no retardation plate is needed, which is advantageous in production of the polarizer. In addition, uneven luminance under a high-temperature condition can be suppressed. In addition, the above-mentioned retardation layer provides two or more regions having different retardations in the display surface plane. Therefore, the retardation corresponding to the respective regions, for example, the retardation corresponding to the reflective region and the retardation corresponding to the transmissive region can be compensated. As a result, the display characteristics can be improved.

In the present description, the "different retardations" means that the retardations in the in-plane or thickness direction are different at least one wavelength in the optical wavelength region (380 to 780 nm). For example, the retardations in the in-plane or thickness direction may be the same at a specific wavelength. Preferably, the "different retardations" means that the retardations in the in-plane or thickness direction are different by 20 nm or more at least one wavelength. The above-mentioned retardation layer may have a single layer structure or a multilayer structure. If the above-mentioned retardation layer has a multilayer structure, the "different retardations" means that at least one layer constituting the retardation layer has a retardation different from other layers. However, it is preferable that it means that the whole retardation layer has different retardations. Examples of the above-mentioned embodiment in which the retardation layer provides two or more regions having different retardations in the display surface plane include an embodiment (1) in which the retardation layer includes two or more portions having different retardations; an embodiment (2) in which the first substrate or the second substrate includes a region where the retardation layer is arranged and a region where the retardation layer is not arranged; and an embodiment (3) in which the first substrate or the second substrate includes a region where the retardation layer is arranged and a region where the retardation layer is not arranged, and the retardation layer includes two or more portions having different retardations. According to these embodiments, the regions having different retardations can be easily provided in the substrate due to the retardation layer. Therefore, the retardation corresponding to each region can be easily compensated.

According to the above-mentioned embodiments (1) to (3), the case where the above-mentioned retardation layer provides two regions having different retardations in the display surface plane is mentioned below. $nx(\lambda)$ and $ny(\lambda)$ ($nx(\lambda) \geq ny(\lambda)$) mean refractive indexes at a wavelength $\lambda$ in directions (in-plane direction) which are parallel to the retardation layer surface and perpendicular to each other; $nz(\lambda)$ means a refractive index at a wavelength of $\lambda$ in the thickness direction (out-plane direction) of the retardation layer; and d means a thickness of the retardation layer. According to the above-mentioned embodiments (1) and (3), an embodiment in which the portions A and B of the retardation layer are both A plate layers ($nx(\lambda) \neq ny(\lambda)$, and $nx(\lambda)=nz(\lambda)$, or $ny(\lambda)=nz(\lambda)$), and the retardations in the in-plane direction ($nx(\lambda)-ny(\lambda)) \times d$ or the retardations in the thickness direction ($nx(\lambda)+ny(\lambda))/2-nz(\lambda)) \times d$ are different from each other; an embodiment in which the portions A and B are both C plate layers ($nx(\lambda)=ny(\lambda)$), and the retardations in the in-plane or thickness direction are different from each other; and an embodiment in which the portions A and B are both biaxial retardation layers ($nx(\lambda) \neq ny(\lambda) \neq nz(\lambda)$), and the retardations in the in-plane or thickness direction are different. These embodiments can be realized, for example, if the parts A and B are composed of the same material ($nx_A(\lambda)=nx_B(\lambda)$, $ny_A(\lambda)=ny_B(\lambda)$, and $nz_A(\lambda)=nz_B(\lambda)$), and have different thicknesses ($d_A \neq d_B$) (the parameter with the subscript A is a parameter of the portion A, and the parameter with subscript B is a parameter of the portion B). As the above-mentioned embodiment (2), an embodiment in which the above-mentioned retardation layer is a A plate layer, a C plate layer, or a biaxial retardation layer.

Examples of the above-mentioned A plate layer include a positive A plate layer ($nx(\lambda)>ny(\lambda=nz(\lambda))$) and a negative A plate layer ($nz(\lambda)=nx(\lambda)>ny(\lambda)$). Examples of the above-mentioned C plate layer include a positive C plate layer ($nz(\lambda))>nx(\lambda)=ny(\lambda)$) and a negative C plate layer ($nx=ny>nz$). Examples of the above-mentioned biaxial retardation layer include a positive biaxial retardation layer ($nz(\lambda)>nx(\lambda)>ny(\lambda)$), a negative biaxial retardation layer ($nx(\lambda)>ny(\lambda)>nz(\lambda)$), NRZ ($nz(\lambda)>nx(\lambda)>ny(\lambda)$), and $Nz=(nx(\lambda)-nz(\lambda))/(nx(\lambda)-ny(\lambda))=0$ to 1).

The liquid crystal display device of the technology disclosed herein is not especially limited as long as it includes the first substrate, the liquid crystal layer, the second substrate, and the polarizer as components. The liquid crystal display device may or may not include other components. As an embodiment of the above-mentioned first substrate, an embodiment in which a thin film transistor (TFT), an insulating film, a transparent electrode, and an alignment film are stacked on a substrate in this order from the back face to the display face (TFT array substrate) is mentioned. As an embodiment of the above-mentioned second substrate, an embodiment in which a color layer, a transparent electrode, and an alignment film are stacked on a substrate in this order from the display face to the back face (color filter substrate) is mentioned. If the above-mentioned first or second substrate has such an embodiment, the above-mentioned retardation layer may be arranged in the region on the liquid crystal layer side of the electrode and the alignment film. In addition, the above-mentioned retardation layer may be arranged in the region on the substrate side of the electrode and the alignment film. The above-mentioned polarizer is not especially limited as long as it includes at least a linear polarizing element. Examples of the polarizer include a polarizer including a linear polarizing element; a polarizer in which a linear polarizing element and a retardation plate such as a biaxial negative refractive index ellipsoid are stacked; and a polarizer in which a linear polarizing element and a retardation plate which produces a retardation of substantially $\lambda/2$ between two polarization components oscillating in mutually vertical directions of transmissive light having a wavelength of $\lambda$. As the above-mentioned linear polarizing element, one prepared by adsorbing a dichroic substance such as iodine to a polyvinyl alcohol (PVA) film and aligning the dichroic substance in one direction is preferably used. The above-mentioned linear polarizing element may have surfaces covered with a protective layer such as triacetyl cellulose (TAC) in order to protect the polarization characteristics.

If the above-mentioned liquid crystal display device is a transflective liquid crystal display device, the above-mentioned liquid crystal display device generally includes a polarizer also on the back face side of the first substrate (herein after, also referred to as a "polarizer on the back face side") to perform transmissive display. That is, the above-mentioned liquid crystal display device generally has a structure in which the polarizer on the back face side, the first substrate including a reflective layer, the liquid crystal layer, the second substrate, and the polarizer are stacked in this order from the back face to the display face. As the above-mentioned polarizer on the back face side, those mentioned in the above-mentioned polarizer may be mentioned. If the above-mentioned liquid crystal display device is a transflective liquid crystal display device, the above-mentioned liquid crystal display device generally includes a backlight in the region on the back face side of the polarizer on the back face side.

It is preferable that the two or more regions having different retardations have different optic axis directions. That is, if the above-mentioned retardation layer provides, in the display surface plane, two or more regions which differ in retardation and optic axis direction, display characteristics of each region can be independently optimized. Examples of the above-mentioned embodiment in which the above-mentioned retardation layer provides, in the display surface plane, two or more regions which differ in retardation and optic axis direction, one region is a C plate layer, an A plate layer, or a biaxial retardation layer and the other is a nonretardation layer (isotropic layer); an embodiment in which one region is a C plate layer and the other region is an A plate layer; an embodiment in which one region is a C plate layer and the other region is a biaxial retardation layer; and an embodiment in which one region is an A plate layer and the other region is a biaxial retardation layer.

It is preferable that the retardation layer includes a mesogenic polymer. According to this, the retardation layer can be simply formed. In the present description, the mesogenic material means a mesogenic group-containing compound (monomer). For example, polymerizable liquid crystal (polymerizable functional group-containing liquid crystal) such as polymerizable nematic liquid crystal may be mentioned. The above-mentioned mesogenic group means an atomic group which includes a permanent dipole having a long thin bar shape or a plate shape and having a size suitable for keeping the liquid crystal state inside the molecule. The above-mentioned mesogenic group may or may not include a polymerizable functional group. Compounds represented by the following formulae (1) to (3) may be mentioned as the above-mentioned mesogenic group.

[Formula 1]

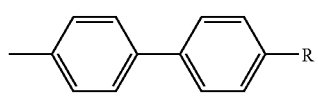
(1)

[Formula 2]

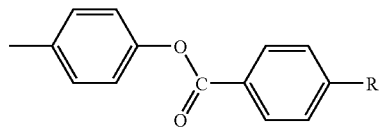
(2)

[Formula 3]

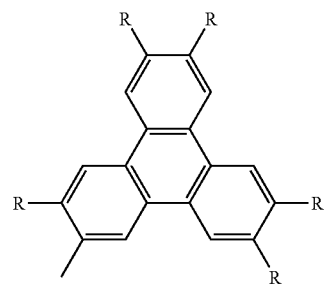
(3)

In the above formulae (1) to (3), R each independently represents an atomic group such as an alkyl group, an alkoxyl group, a cyano group, and a nitro group. Compounds represented by the following formulae (4) and (5) may be mentioned as the above-mentioned polymerizable functional group.

[Formula 4]

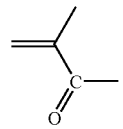
(4)

[Formula 5]

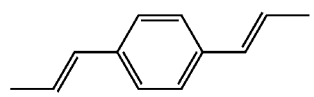
(5)

Examples of the method of forming the above-mentioned retardation layer include a method including the steps of: coating a mesogenic material; polymerizing and curing the mesogenic material while controlling alignment by ultra violet irradiation and the like; and patterning the cured material by a photolithography method and the like.

It is preferable that the liquid crystal display device includes a retardation control alignment film on the retardation layer. The use of the above-mentioned retardation control alignment film permits control of the retardation of the retardation layer in the step of forming the retardation layer. Therefore, the retardation layer can be simply formed. As the embodiment of the above-mentioned retardation control alignment film, an embodiment in which the rubbing direction varies depending on the region, and an embodiment in which the constituting material varies depending on the region, and the like, may be mentioned. According to these embodiments, the above-mentioned (1) and (3) embodiments in which the retardation layer includes two or more portions which differ in retardation are easily permitted. In the present description, the retardation control alignment film is formed to control alignment of molecules constituting the retardation layer, and it is formed independently from a film (alignment film) formed to control alignment of liquid crystal molecules constituting the liquid crystal layer. A polyimide resin and the like is mentioned as the material for the above-mentioned retardation control alignment film. The same material as in the above-mentioned alignment film may be used. As a method of forming the above-mentioned retardation control alignment film, a method including the steps of: coating a resin composition in which a material for the retardation control alignment film is dissolved; drying the coated resin composition; and providing the dried composition with a rubbing treatment using a metal roller may be mentioned.

It is preferable that the liquid crystal display device includes a reflective region where the reflective layer is arranged and a transmissive region where the reflective layer is not arranged, and the retardation layer provides retardations different between the reflective region and the transmissive region. If including the reflective region and the transmissive region, the above-mentioned liquid crystal-display device can perform the reflective display and the transmissive display simultaneously. Therefore, display can be performed in any environment regardless of surrounding light. The above-mentioned transmissive region and the above-mentioned reflective region have different preferable retardation compensations. However, if the above-mentioned retardation layer provides retardations different between the reflective region and the transmissive region, display qualities in the reflective display and those in the transmissive display can be individually improved.

It is preferable that the retardation layer is arranged in the transmissive region and the reflective region, and the retardation layer has different retardations between a portion of the retardation layer arranged in the transmissive region and a portion of the retardation layer arranged in the reflective region. According to this, the retardation layer has different retardations between the transmissive region and the reflective region. Therefore, the display qualities in the reflective display and those in the transmissive display can be individually improved.

It is preferable that the retardation layer is arranged in the reflective region but not arranged in the transmissive region. According to this, the retardation layer is formed only in the reflective region, and thereby the display qualities in the reflective display can be improved without dramatically changing an amount of leaking transmissive light relative to change in viewing angle.

It is preferable that in the reflective region, the retardation layer produces a retardation of substantially $\lambda/4$ between polarization components of light, the light having a wavelength of $\lambda$ and entering from a direction substantially vertical to the retardation layer. According to this, if light entering from the display face side is circularly polarized, the reflective display can be performed in normally black mode, and therefore the reflective display with high visibility can be performed also under strong external light.

The above-mentioned polarization components generally mean two polarization components oscillating in mutually perpendicular directions.

In the present description, $\lambda$ means one or more wavelength values of 380 to 780 nm. Further, the substantially $\lambda/4$ includes not only $\lambda/4$ but also a value which seems to be substantially equal to $\lambda/4$ unless the operation and effects of the technology disclosed herein are sacrificed.

It is preferable that the phase delay axis of the above-mentioned $\lambda/4$ retardation layer makes an angle of 40° to 50° with the absorption axis of the linear polarizing element.

It is preferable that the first substrate or the second substrate includes two or more color layers having different dominant wavelengths in the region on the liquid crystal layer side of the reflective layer, the retardation layer produces a retardation of substantially $\lambda_A/4$ between polarization components of light, the light having a wavelength of $\lambda_A$ and entering from a direction substantially vertical to the retardation layer (herein after, also referred to as a "$\lambda_A/4$ retardation layer"), in a reflective region where the two or more color layers are arranged, and the polarizer includes a retardation plate which produces a retardation of substantially $\lambda_A/2$ between polarization components of light, the light having a wavelength of $\lambda_A$ and entering from a direction substantially vertical to the retardation plate (herein after, also referred to as a "$\lambda_A/2$ retardation plate"). According to this, the two or more color layers having different dominant wavelengths are arranged in the reflective region. However, broadband circular polarization is permitted by arranging the $\lambda_A/4$ retardation layer and the $\lambda_A/2$ retardation plate. Therefore, discoloration of the reflective display can be suppressed without stacking a plurality of retardation layers or using a special material. In the present description, the dominant wavelength of the color layer means a wavelength of light, which accounts for a large proportion in light passing through the color layer and which is to be provided with a retardation of substantially $\lambda_A/4$ between polarization components (which is to be circularly polarized) by the retardation layer. The wavelength to be circularly polarized is generally determined taking sensitivity of human eyes and the like into consideration. It is not necessarily the same as the maximum value of the transmittance of the color layer.

The above-mentioned $\lambda A/2$ retardation plate is generally arranged in the region on the back face side of the linear polarizing element in the polarizer. It is sufficient that the above-mentioned $\lambda A/2$ retardation plate is arranged in the reflective region where two or more color layers are arranged in terms of exhibition of the operation and effects of the technology disclosed herein. It is preferable that the $\lambda A/2$ retardation plate is not arranged in the transmissive region in order to suppress a reduction in contrast of the transmissive display. However, the above-mentioned $\lambda A/2$ retardation plate may be arranged also in the transmissive region in order to suppress discoloration of the reflective display.

It is more preferable that the first substrate or the second substrate includes the first to the third color layers having different dominant wavelengths in the region on the liquid crystal layer side of the reflective layer; the retardation layer produces a retardation of substantially $\lambda_A/4$ between polarization components of light, the light having a wavelength of $\lambda_A$ and entering from a direction substantially vertical to the retardation layer, in a reflective region where the first to the third color layers are arranged; and the polarizer includes a $\lambda_A/2$ retardation plate. The reflective display with a wide color reproduction range can be performed if the above-mentioned first or second substrate includes the first to the third color layers having different dominant wavelengths in the region on the liquid crystal layer side of the reflective layer. Further, discoloration of the reflective display can be suppressed without stacking a plurality of retardation layers or using a special material because the $\lambda_A/4$ retardation layer and the $\lambda_A/2$ retardation plate are arranged.

Figure 7:
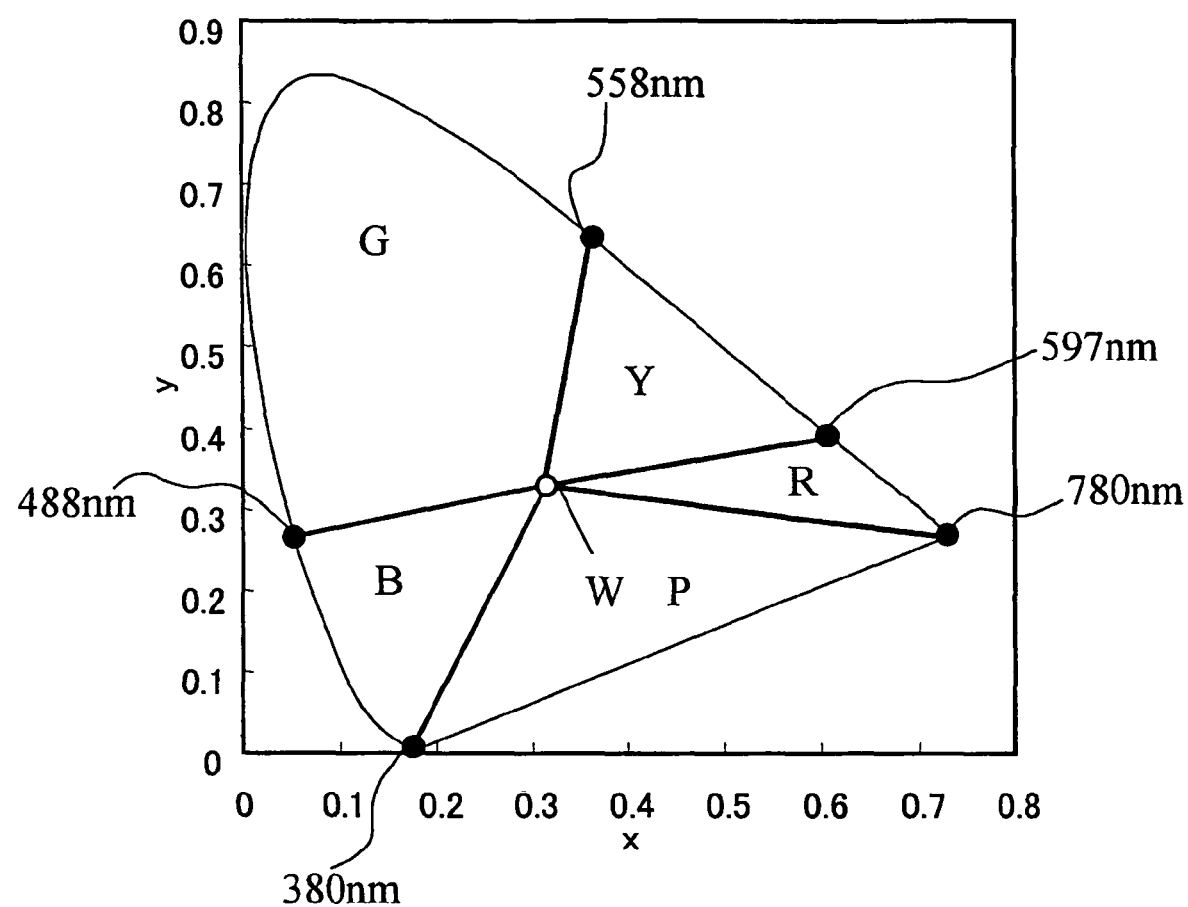
FIG. 7 is an xy chromaticity diagram in an XYZ colorimetric system, showing color definition in the present description. In the figure, R represents red; Y represents yellow; G represents green; B represents blue; P represents purple; and W represents white.

It is preferable that in order to effectively obtain operation and effects of the technology disclosed herein, $\lambda A = \lambda 1$, $\lambda A = \lambda 2$, or $\lambda A = \lambda 3$ is satisfied when a dominant wavelength of the first color layer is defined as $\lambda 1$, a dominant wavelength of the second color layer is defined as $\lambda 2$, and a dominant wavelength of the third color layer is defined as $\lambda 3$ ($\lambda 1 \neq \lambda 2 \neq \lambda 3$, and $\lambda 1 \neq \lambda 3$). In addition, the above-mentioned $\lambda A$, $\lambda 1$, $\lambda 2$, and $\lambda 3$ each show one wavelength value of 380 to 780 nm, generally. FIG. 7 is an xy chromaticity diagram in an XYZ colorimetric system, showing color definition in the present description. In the figure, R represents red; Y represents yellow; G represents green; B represents blue; P represents purple; and W represents white. In this description, as shown in FIG. 7, the red (R) is a color having a dominant wavelength of 597 nm or more and 780 nm or less in the xy chromaticity diagram in the XYZ colorimetric system and preferably 600 nm or more and 620 nm or less; the yellow is a color having a dominant wavelength of 558 nm or more and less than 597 nm, and preferably 570 nm or more and 582 nm or less; the green is a color having a dominant wavelength of 488 nm or more and less than 558 nm, and preferably 520 nm or more and 557 nm or less; and the blue is a color having a dominant wavelength of 380 nm or more and less than 488 nm, and preferably 455 nm or more and 475 nm or less. Accordingly, red, green, blue, and the like may be mentioned as colors of the above-mentioned first to third color layers.

If the first to the third color layers are composed of red, green, and blue color layers, the above-mentioned $\lambda A$ value is preferably close to the dominant wavelength of the green color layer than the dominant wavelengths of the red and blue color layers, and preferably it is substantially the same as the dominant wavelength of the green color layer in order to effectively obtain the operation and effects of the technology disclosed herein. It is preferable that the phase delay axis of the above-mentioned $\lambda A/4$ retardation layer makes an angle of 50° to 70° with the phase delay axis of the $\lambda A/2$ retardation plate in the polarizer. It is also preferable that the phase delay axis of the $\lambda A/4$ retardation layer makes an angle of 55° to 95° with the absorption axis of the linear polarizing element.

In the present description, a resin into which a pigment or a dye is dispersed and the like may be mentioned as a material for the color layer.

It is preferable that the first substrate or the second substrate includes two or more color layers having different dominant wavelengths in the region on the liquid crystal layer side of the reflective layer, the retardation layer produces a retardation of substantially $\lambda_B/4$ between polarization components of light, the light having a wavelength of $\lambda_B$ and entering from a direction substantially vertical to the retardation layer, in a reflective region where a color layer having a dominant wavelength of $\lambda_B$ is arranged, and the retardation layer produces a retardation of substantially $\lambda_C/4$ between polarization components of light, the light having a wavelength of $\lambda_C$ and entering from a direction substantially vertical to the retardation layer, in a reflective region where a color layer having a dominant wavelength of $\lambda_C$ ($\lambda_C \neq \lambda_B$) is arranged. According to this, the retardation layers corresponding to the respective color layers having different dominant wavelengths are formed, which makes it possible to suppress discoloration of the reflective display without stacking a plurality of retardation layers or using a special material. In addition, broadband circular polarization is permitted, and therefore, the $\lambda/2$ retardation plate is not needed, which is advantageous for productivity of the polarizer.

The above-mentioned $\lambda_B$ and $\lambda_C$ each show one wavelength value of 380 to 780 nm, generally.

It is more preferable that the first substrate or the second substrate includes the fourth to the sixth color layers having different dominant wavelengths in the region on the liquid crystal layer side of the reflective layer, the retardation layer produces a retardation of substantially $\lambda_4/4$ between polarization components of light, the light having a wavelength of $\lambda_4$ and entering from a direction substantially vertical to the retardation layer, in a reflective region where the fourth color layer having a dominant wavelength of $\lambda_4$ is arranged, and the retardation layer produces a retardation of substantially $\lambda_5/4$ between polarization components of light, the light having a wavelength of $\lambda_5$ and entering from a region substantially vertical to the retardation layer, in a reflective region where the fifth color layer having a dominant wavelength of $\lambda_5$ ($\lambda_5 \neq \lambda_4$) is arranged, and the retardation layer produces a retardation of substantially $\lambda_6/4$ between polarization components of light, the light having a wavelength of $\lambda_6$ and entering from a direction substantially vertical to the retardation layer, in a reflective region where the sixth color layer having a dominant wavelength Of $\lambda_6$ ($\lambda_6 \neq \lambda_4$ and $\lambda_6 \neq \lambda_5$) is arranged. The reflective display with a wide color reproduction range can be performed because the above-mentioned first or second substrate includes the fourth to the sixth color layers having different dominant wavelengths in the region on the liquid crystal layer side of the reflective layer. In addition, the above-mentioned retardation layer has the above-mentioned configuration, and therefore, discoloration of the reflective display can be suppressed without stacking a plurality of retardation layers or using a special material. The above-mentioned $\lambda_4$, $\lambda_5$, and $\lambda_6$ each show one wavelength value of 380 to 780 nm, generally. Accordingly, red, green, blue, and the like may be mentioned as colors of the above-mentioned fourth to sixth color layers. In addition, it is preferable that the phase delay axis of the above-mentioned retardation layer makes an angle of 40° to 50° with the absorption axis of the linear polarizing element.

It is preferable that the first substrate or the second substrate includes two or more color layers having different dominant wavelengths in the region on the liquid crystal layer side of the reflective layer, and the retardation layer has reverse wavelength dispersion characteristics. According to this, broadband circular polarization is permitted corresponding to the respective color layers having different dominant wavelengths. Therefore, to form such a retardation layer without increasing the processes is advantageous in productivity and costs. In the present description, the reverse wavelength dispersion characteristics satisfy one of the following relationships: (retardation in the in-plane direction at a wavelength of 450 nm)<(retardation in the in-plane direction at a wavelength of 550 nm)<(retardation in the in-plane direction at a wavelength of 650 nm); and (retardation in thickness direction at a wavelength of 450 nm)<(retardation in the thickness direction at a wavelength of 550 nm)<(retardation in the thickness direction at a wavelength of 650 nm). Modified polycarbonate and the like is mentioned as a material for the above-mentioned retardation layer showing reverse wavelength dispersion characteristics.

The following embodiment is mentioned as the wavelength dispersion characteristics (reverse wavelength dispersion characteristics) may be mentioned. The first substrate or the second substrate includes the seventh color layer having a dominant wavelength of $\lambda_7$, the eighth color layer having a dominant wavelength of $\lambda_8$ ($\lambda_7 < \lambda_8$), and the ninth color layer having a dominant wavelength of $\lambda_9$ ($\lambda_8 < \lambda_9$) in the region on the liquid crystal layer side of the reflective layer; the same retardation layer is arranged in the reflective regions where the seventh to the ninth color layers are arranged; the retardation layer produces a retardation of substantially $\lambda_7/4$ between polarization components of light, the light having a wavelength of $\lambda_7$ and entering from a direction substantially vertical to the retardation layer; the retardation layer produces a retardation of substantially $\lambda_8/4$ between polarization components of light, the light having a wavelength of $\lambda_8$ and entering from a direction substantially vertical to the retardation layer; and the retardation layer produces a retardation of substantially $\lambda_9/4$ between polarization components of light, the light having a wavelength of $\lambda_8$ and entering from a direction substantially vertical to the retardation layer. The reflective display with a wide color reproduction range can be performed because the above-mentioned first or second substrate includes the seventh to the ninth color layers having different dominant wavelengths in the region on the liquid crystal layer side of the reflective layer. Further, the above-mentioned retardation layer shows the above-mentioned reverse wavelength dispersion characteristics. Therefore, discoloration of the reflective display can be suppressed without stacking a plurality of retardation layers or using a special material. In addition, the above-mentioned $\lambda_7$, $\lambda_8$, and $\lambda_9$ each show one wavelength value of 380 to 780 nm, generally. Accordingly, red, green, blue, and the like may be mentioned as colors of the above-mentioned seventh to ninth color layers. It is preferable that the phase delay axis of the above-mentioned retardation layer makes an angle of 40° to 50° with the absorption axis of the linear polarizing element.

The above-mentioned retardation layer may have a single layer structure or a multilayer structure. If the above-mentioned retardation layer has a multilayer structure, it is preferable that the whole of the above-mentioned retardation layer preferably produces a retardation of substantially $\lambda/4$ between polarization components of light, the light having a wavelength of $\lambda$ and entering from a direction substantially vertical to the retardation layer, and the whole of the retardation layer shows the reverse wavelength dispersion characteristics.

It is preferable that the liquid crystal display device performs display by aligning liquid crystal molecules constituting the liquid crystal layer in a direction substantially vertical to a substrate surface when a voltage lower than a threshold voltage is applied and by aligning the liquid crystal molecules in a direction substantially parallel to the substrate surface when a voltage larger than the threshold voltage is applied. According to such a vertical alignment (VA) mode, the contrast ratio can be more improved. If the above-mentioned liquid crystal display device is in VA mode, it is preferable that the above-mentioned alignment film is a vertical alignment film. In addition, the above-mentioned liquid crystal molecules for the liquid crystal layer preferably have a negative dielectric anisotropy ($\Delta \epsilon < 0$) and preferably the liquid crystal molecules are nematic liquid crystals of $\Delta \epsilon < 0$. Examples of the above-mentioned VA mode include a mode in which one pixel is divided into a plurality of regions, thereby aligning liquid crystal molecules in various directions that are substantially parallel to the substrate surface (multi-domain vertical alignment (MVA) mode); a mode in which liquid crystal molecules axially symmetrically align in a direction substantially parallel to the substrate surface (ASM (Axially Symmetricaligned Micro Cell mode); a mode in which using electric-field control by patterning of an electrode, the direction of the liquid crystal molecules when the molecules are aligned in the direction substantially parallel to the substrate face is controlled, thereby suppressing a structure for division, formed in the pixel, from reducing an aperture (PVA (Patterned Vertical Alignment) mode); a mode in which, in each sub-pixel, the liquid crystal molecules are radially aligned from the center to an edge part of a sub-pixel in the direction substantially parallel to the substrate surface when a voltage larger than a threshold voltage is applied (CPA (Continuous Pinwheel Alignment) mode). According to these modes, the viewing angle dependence can be more reduced in comparison to that in the common VA mode.

It is preferable that the first substrate or the second substrate includes an insulating layer in the reflective region, the insulating layer making a thickness of the liquid crystal layer in the reflective region smaller than a thickness of the liquid crystal layer in the transmissive region. According to this, optical loss in the reflective region can be reduced, and therefore bright reflective display can be performed. It is preferable that the above-mentioned insulating layer is arranged not in the first substrate but in the second substrate. According to this, the edge part of the insulating layer, that is, the region which makes no contribution to display in the boundary between the transmissive region and the reflective region can be reduced. Therefore, the aperture ratio can be improved. It is preferable that the thickness of the liquid crystal layer in the reflective region is substantially half of the thickness of the liquid crystal layer in the transmissive region. That is, it is preferable that the thickness of the insulating layer is substantially half of the thickness of the liquid crystal layer. As a result, the optical path length in the reflective region can be substantially equal to the optical path length in the transmissive region, and therefore the display qualities can be more improved. It is preferable that the liquid crystal layer in the transmissive region has a retardation (And) of 270 to 400 nm. The above-mentioned retardation layer may be arranged in the region on the liquid crystal layer side of the insulating layer or far from the liquid crystal layer than the insulating layer. The material for the above-mentioned insulating layer is not especially limited. An acrylic resin may be mentioned, for example.

It is preferable that the retardation layer is arranged in the reflective region and makes a thickness of the liquid crystal layer in the reflective region smaller than a thickness of the liquid crystal layer in the transmissive region. According to this, optical loss in the reflective region can be reduced, and therefore bright reflective display can be performed. Further, there is no need to form an insulating film for forming a multi-gap structure, and therefore, the productivity can be improved. In this case, it is preferable that the above-mentioned retardation layer is arranged not in the first substrate but in the second substrate. According to this, the edge part of the insulating layer, that is, the region which makes no contribution to display in the boundary between the transmissive region and the reflective region can be reduced. Therefore, the aperture ratio can be improved. It is preferable that the thickness of the liquid crystal layer in the reflective region is substantially half of the thickness of the liquid crystal layer in the transmissive region. That is, it is preferable that the thickness of the above-mentioned retardation layer is substantially half of the thickness of the liquid crystal layer. According to this, the optical path length in the reflective region can be substantially equal to the optical path length in the transmissive region. Therefore, display qualities can be improved. It is preferable that the retardation (And) of the liquid crystal layer in the transmissive region is 270 to 400 nm.

It is preferable that the liquid crystal display device includes two or more color layers having different dominant wavelengths, in the region on the liquid crystal layer side of the reflective layer of the first substrate, or in a region where the reflective layer is not arranged of the first substrate, or in the second substrate, and the retardation layer provides retardations different among regions where the color layers having different dominant wavelengths are arranged. According to this, the retardation can be compensated corresponding to spectroscopic characteristics of the respective color layers, and therefore display characteristics can be improved.

More preferable embodiments of the above-mentioned liquid crystal display device include: an embodiment (A) in which the liquid crystal display device includes two or more color layers having different dominant wavelengths in the transmissive region of the first or second substrate, and the retardation layer provides retardations different among the transmissive regions where the color layers having different dominant wavelengths are arranged; and an embodiment (B) in which the liquid crystal display device includes two or more color layers having different dominant wavelengths in the reflective region of the first or second substrate, and the retardation layer provides retardations different among the reflective regions where the color layers having different dominant wavelengths are arranged. According to the embodiment (A), the retardation can be compensated corresponding to spectroscopic characteristics of the respective color layers in the transmissive region, and therefore characteristics of the transmissive display can be improved. According to the embodiment (B), the retardation can be compensated corresponding to spectroscopic characteristics of the respective color layers in the reflective region, and therefore characteristics of the reflective display can be improved.

It is more preferable that the liquid crystal display device includes the tenth to the twelfth color layer having different dominant wavelengths, and the retardation layer provides retardations different among the region where the tenth color layer is arranged, the region where the eleventh color layer is arranged, and the region where the twelfth color layer is arranged. The display with a wide color reproduction range can be performed if the above-mentioned liquid crystal display device includes the tenth to twelfth color layers having different dominant wavelengths. In addition, the above-mentioned retardation layer provides retardations different among the region where the tenth color layer is arranged, the region where the eleventh color layer is arranged, and the region where the twelfth color layer is arranged, and thereby the retardation can be compensated corresponding to spectroscopic characteristics of the respective color layers. Therefore, the display characteristics can be more improved.

EFFECT OF THE INVENTION

According to the liquid crystal display device of the technology disclosed herein, the retardation layer provides two or more regions having different retardations in the display surface plane. Therefore, the retardation can be compensated corresponding to the respective regions where display modes are different, and as a result, the display characteristics can be improved.

Embodiment 1

Figures 1, 2:
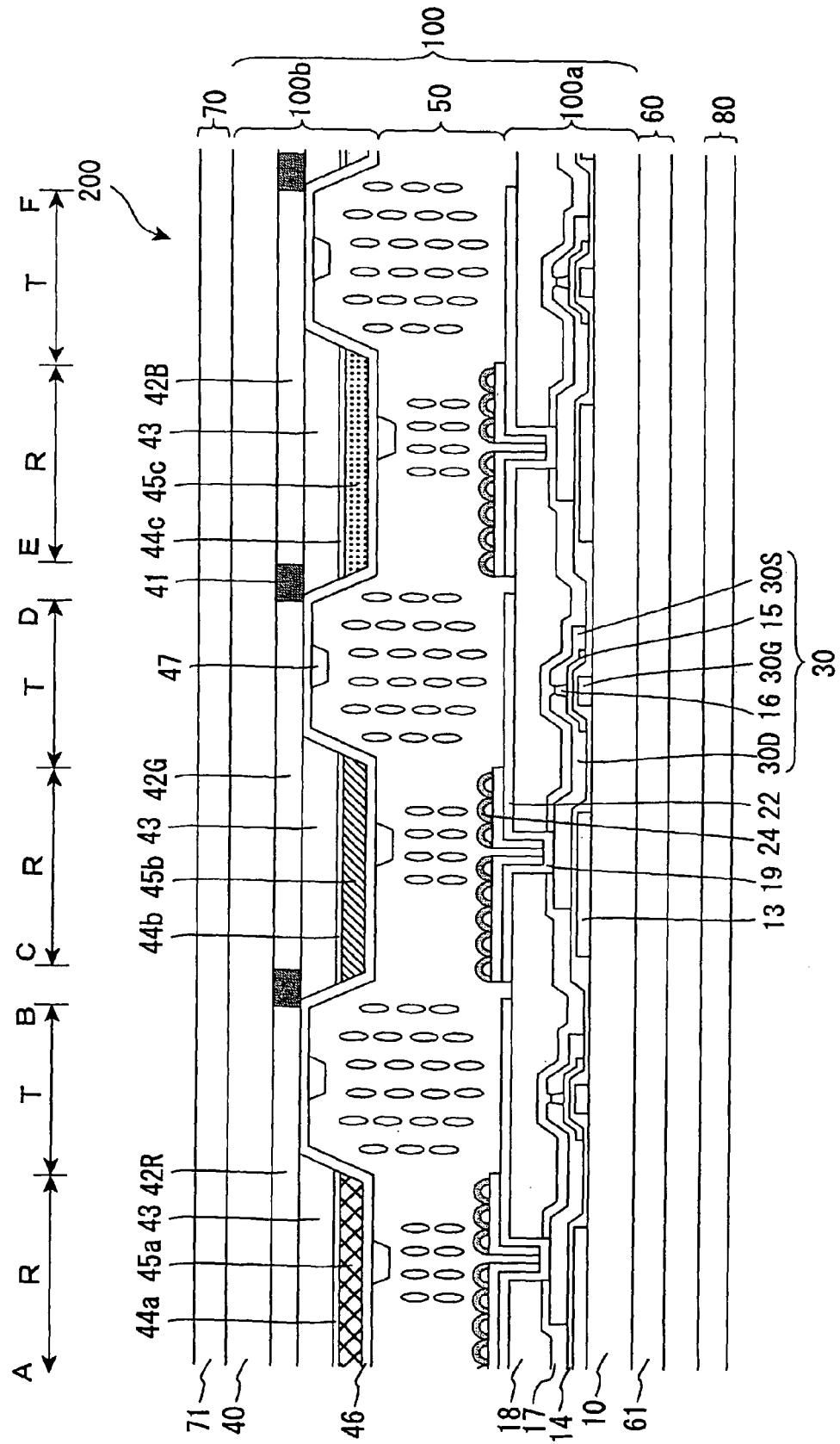

FIG. 1-1 is a planar view schematically showing a configuration of a liquid crystal display device in accordance with Embodiment 1 of the technology disclosed herein. FIG. 1-2 is a cross-sectional view schematically showing a configuration of cross-sections of the liquid crystal display device in FIG. 1-1, taken along lines A-B, C-D, and E-F, the cross-sections being connected to each other in this order from the left to the right side.

As shown in FIGS. 1-1 and 1-2, a liquid crystal display device 200 according to the present Embodiment includes a thin film transistor (TFT) array substrate (the first substrate) 100a and a color filter (CF) substrate (the second substrate) 100b, a liquid crystal layer 50 between these substrates, polarizers 60 and 70, and a backlight 80. The liquid crystal display device 200 includes a transmissive region T and a reflective region R in each of a plurality of pixel regions arrayed in a matrix pattern, and it can perform transmissive display and reflective display at the same time. The liquid crystal display device 200 also can perform either one of the transmissive display and the reflective display. In the transmissive region T of the TFT array substrate 10a, a pair of electrodes 22 and 46 for applying a voltage to the liquid crystal layer 50 is arranged. Further, the transmissive region T can transmit light from a backlight 80. In the reflective region R of the TFT array substrate 100a, a pair of electrodes 24 and 46 for applying a voltage to the liquid crystal layer 50 is arranged. Further, the reflective region R can emit light reflected by the reflective electrode 24.

The TFT array substrate 100a includes, a pixel electrode 22 formed in each pixel region, a TFT 30 arranged as a switching element corresponding to the pixel electrode 22, a gate wiring 11 and a source wiring 12 electrically connected to the TFT 30, and a storage capacitor wiring 13 formed to cross the pixel electrode 22, and the like. The detail is given below.

According to the TFT array substrate 100a, the gate wiring 11, a gate electrode 30G, the auxiliary capacitance wiring 13, and the like, are formed on a transparent insulating substrate 10 such as a glass substrate. A gate insulating film 14 is formed to cover them. On the gate insulating film 14 formed on the gate electrode 30G, a semiconductor layer 15, a channel protective layer 16, a source electrode 30S, and a drain electrode 30D are formed. These components constitute the TFT 30. In the TFT 30, the gate electrode 30G is electrically connected to the gate wiring 11, and the source electrode 30S is electrically connected to the source wiring 12. The gate wiring 11 and the source wiring 12 are composed of a metal such as tantalum (Ta). According to the present Embodiment, the storage capacitor wiring 13 is composed of the same film as the gate wiring 11 and formed in the same step as the step where the gate wiring 11 is formed.

A protective insulating film 17 and an inter layer insulating film 18 are formed to cover substantially the entire surface of the transparent insulating substrate 10 on which the TFT 30 is formed. On this inter layer insulating film 18 surface, a transparent electrode 22 is formed. On the transparent electrode 22, a reflective electrode 24 is formed. The transparent electrode 22 is composed of a transparent conductive material such as indium tin oxide (ITO). The reflective electrode 24 is composed of a high-reflective metal such as aluminum (AL) and silver (Ag). The transparent electrode 22 is electrically connected to a drain electrode 30D through a contact hole 19 formed in the protective insulating film 17 and the inter layer insulating film 18. The reflective electrode 24 is electrically connected to the drain electrode 30D through the transparent electrode 22 and the contact hole 19. According to the present Embodiment, the transparent electrode 22 and the reflective electrode 24 electrically connected to the drain electrode 30D serve as a pixel electrode. The storage capacitor wiring 13 is electrically connected to a counter electrode 46 formed in the CF substrate 10b, and forms a storage capacitor (Cs) together with the drain electrode 30D and the gate insulating film 14.

The reflective electrode 24 defining the reflective region R includes a part overlapping with the storage capacitor wiring 13, a part overlapping with the gate wiring 11, and a part overlapping with the source wiring 12, as shown in FIG. 1-1. The reflective electrode 24 may have a flat surface (so-called mirror surface) or an uneven surface. If the reflective electrode 24 has an uneven surface, light entering the reflective region R is diffused and reflected, and thereby white display such as almost paper white display can be performed. For example, if a part of the inter layer insulating film 18 (the part below the reflective electrode 24) is formed to have an uneven surface, the reflective electrode 24 can be provided with an uneven surface which reflects the surface shape of the inter layer insulating film 18.

A polarizer 60 is attached to the transparent insulating substrate 10 surface opposite to the liquid crystal layer 50. The polarizer 60 includes a triacetyl cellulose (TAC) film (not shown), a linear polarizing element 61, and a TAC film (not shown). The absorption axis direction of the linear polarizing element 61 is 135°. The linear polarizing element 61 is prepared by adsorbing iodine to a polyvinyl alcohol (PVA) film and then stretching the film. In the present Embodiment, the axis direction is expressed as an angle relative to the array direction of color layers (the direction of RGB).

Figures 1, 2:
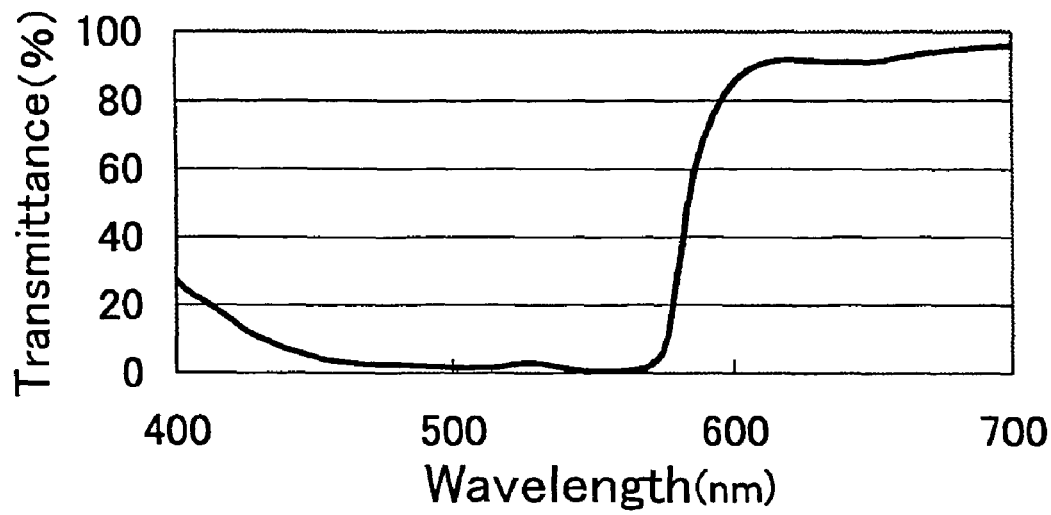
Figure 2:
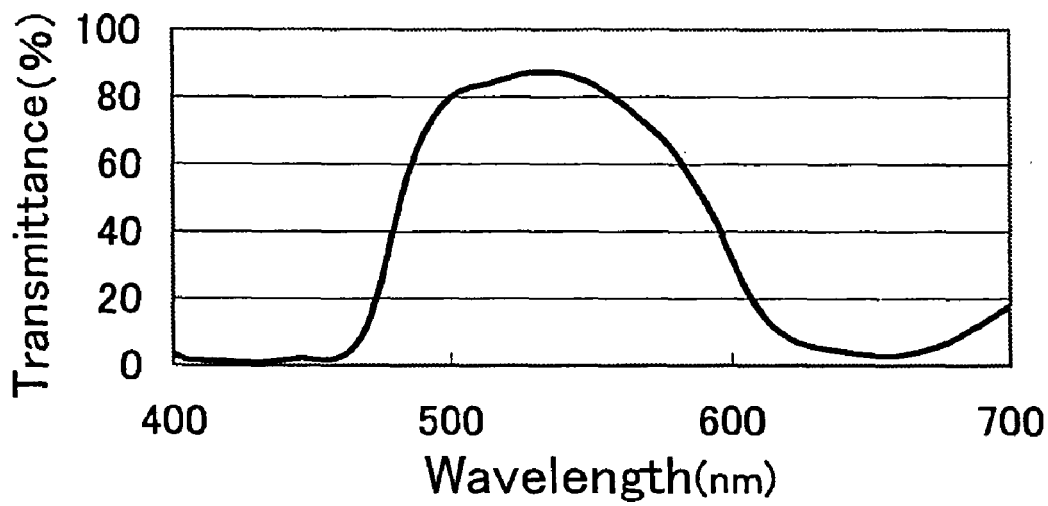
Figures 2, 3:
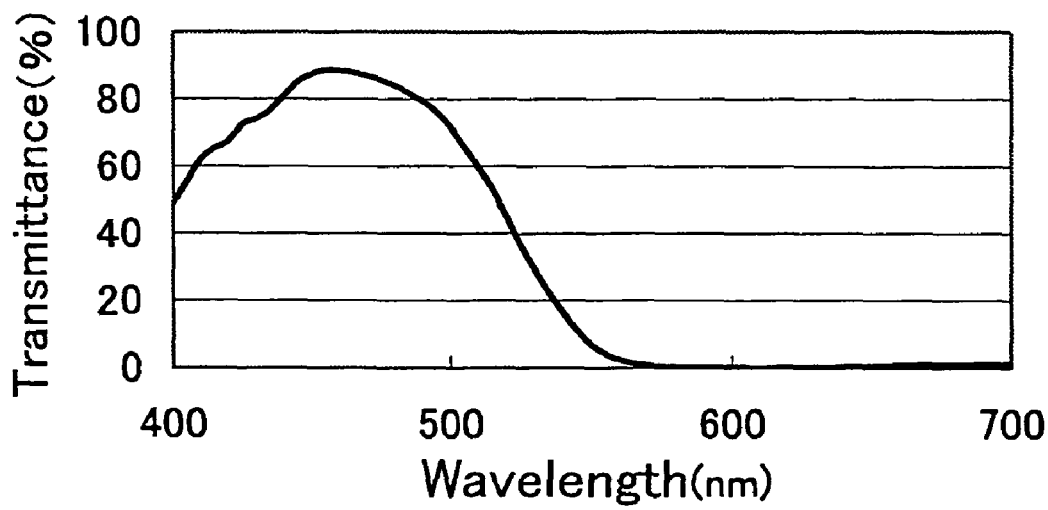
Figure 3:
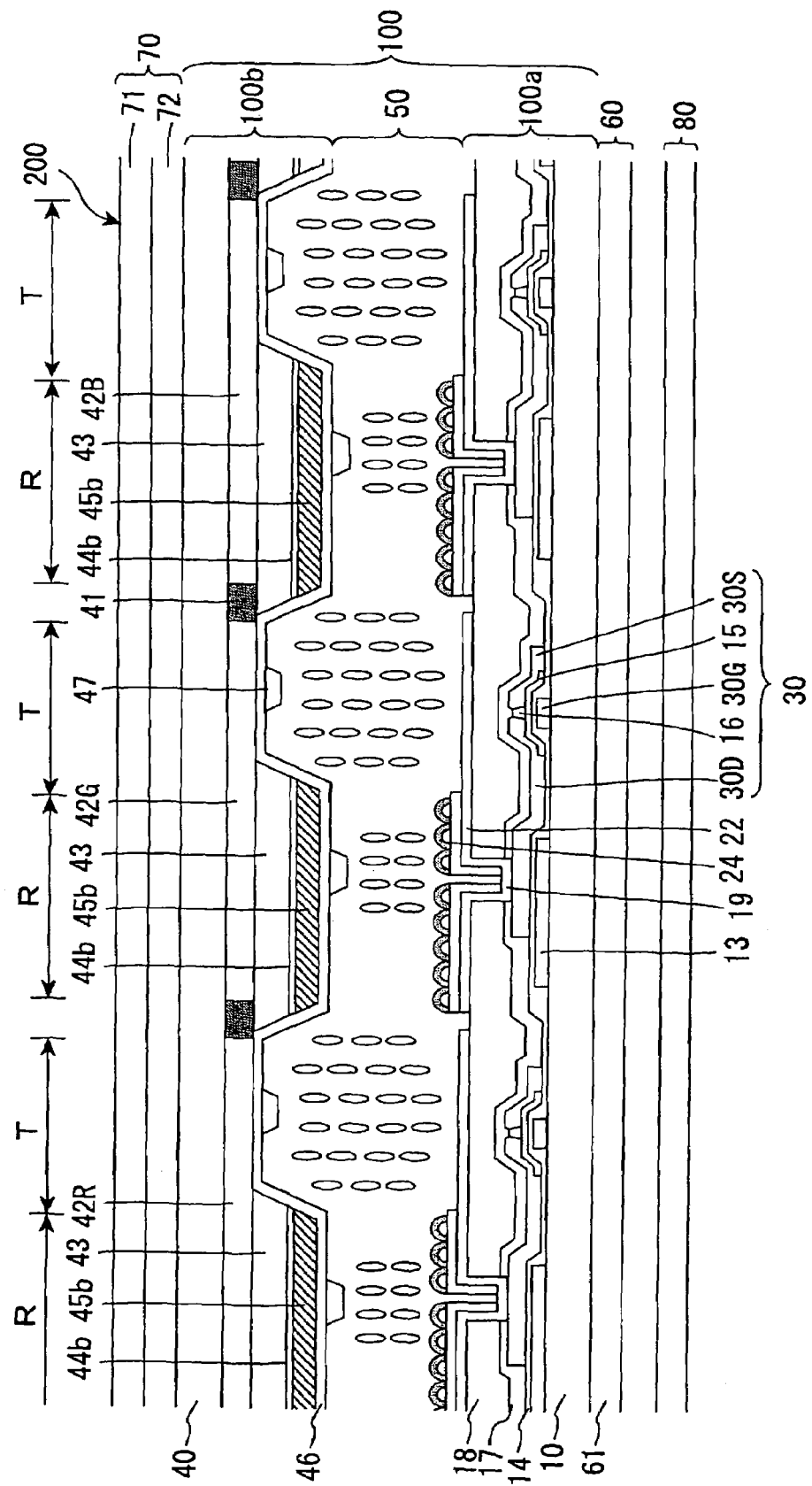

Then, the CF substrate 100b is mentioned below in more detail. The CF substrate 100b includes a transparent insulating substrate 40 such as a glass substrate. On this transparent insulating substrate 40 surface on the liquid crystal layer 50 side, black matrixes (BMs) 41 are formed. Between two BMs 41, a red color layer 42R, a green color layer 42G, or a blue color layer 42B is formed over the transmissive region T and the reflective region R. FIGS. 2-1 to 2-3 show one example of spectropic characteristics of the color layers 42R, 42G, and 42B, respectively. According to the present Embodiment, the color layer 42R has a dominant wavelength of 600 nm; the color layer 42G has a dominant wavelength of 550 nm; and the color layer 42B has a dominant wavelength of 450 nm. A transparent resin layer (insulating layer) 43 is formed on the color layers 42R, 42G, and 42B in the reflective region R, that is, in the regions facing the reflective electrode 24. The transparent resin layer 43 is generally color less and composed of an acrylic resin and the like.

A retardation control alignment film 44a and a retardation layer 45a are formed on the transparent resin layer 43 formed on the red color layer 42R. A retardation control alignment film 44b and a retardation layer 45b are formed on the transparent resin layer 43 formed on the green color layer 42G. A retardation control alignment film 44c and a retardation layer 45c are formed on the transparent resin layer 43 formed on the blue color layer 42B. The retardation layer 45a produces a retardation of 150 nm between two polarization components oscillating in mutually perpendicular directions of transmissive light having a wavelength of 600 nm. The retardation layer 45b produces a retardation of 140 nm between two polarization components oscillating in mutually perpendicular directions of transmissive light having a wavelength of 550 nm. The retardation layer 45c produces a phase retardation of 115 nm between two polarization components oscillating in mutually perpendicular directions of transmissive light having a wavelength of 450 nm. That is, each of the retardation layers 45a to 45c produces a retardation of substantially $\lambda/4$ between two polarization components oscillating in mutually perpendicular directions of light which has a wavelength of $\lambda$ ($\lambda$ shows a dominant wavelength of the color layer) and which has passed through the colored layer. The retardation layers 45a to 45c each have a phase delay axis direction of 90°. The retardation layers 45a to 45c may be composed of the same or different materials as long as the above-mentioned characteristics are exhibited. The retardation control alignment films 44a to 44c may be composed of the same material or different materials as long as the retardation layers 45a to 45c show the above-mentioned characteristics. In accordance with the present Embodiment, a polymer composed of the polymerizable nematic liquid crystal is used as a material for the retardation layers 45a to 45c. A polymeric material such as polyimide is used as a material for the retardation control alignment films 44a to 44c.

A counter electrode 46 composed of a transparent conductive material such as an ITO is formed to cover the retardation layers 45a to 45c and the color layers 42R, 42G, and 42B. Further, on the counter electrode 46, projections for liquid crystal alignment control 47 composed of a polymeric material such as polyimide are regularly formed. The shape of the projection for liquid crystal alignment control 47 is not especially limited.

A polarizer 70 is attached to the transparent insulating substrate 40 surface opposite to the liquid crystal layer 50. The polarizer 70 includes a TAC film (not shown), a linear polarizing element 71, and a TAC film (not shown). The absorptive axis direction of the linear polarizing element 71 is 45°. Accordingly, the linear polarizing elements 71 and 61 are arranged in a cross-Nicol relationship. The linear polarizing element 71 is prepared by adsorbing iodine to a PVA film and then stretching the film.

Further, on the TFT array substrate 100a and the CF substrate 100b surfaces on the liquid crystal layer 50 side, an alignment film (not shown) composed of a polymeric material such as polyimide is formed. These liquid crystal alignment films are provided with a rubbing treatment to vertically align the liquid crystal molecules constituting the liquid crystal layer 50. The TFT array substrate 100a and the CF substrate 100b are attached to each other with a sealing material (not shown) composed of an epoxy resin and the like there between. In the space between these substrates, a liquid crystal material for the liquid crystal layer 50 is interposed. According to the present Embodiment, nematic liquid crystal having a negative dielectric anisotropy ($\Delta\epsilon<0$) is used as the liquid crystal material for the liquid crystal layer 50.

According to the liquid crystal display device of the present Embodiment, the thickness of the liquid crystal layer 50 in the reflective region R is substantially half of the thickness of the liquid crystal layer 50 in the transmissive region T. As a result, optical loss in the reflective region R is reduced and thereby bright reflective display can be performed.

The retardation of the liquid crystal layer 50 is set to 370 nm in the transmissive region T and 185 nm in the reflective region R.

The following Table 1 shows parameters of the respective optical members in the liquid crystal display device according to the present Embodiment.

TABLE 1

| | | Red | | Green | | Blue | |
|---|---|---|---|---|---|---|---|
| | | Transmissive region | Reflective region | Transmissive region | Reflective region | Transmissive region | Reflective region |
| Linear polarizing element on CF substrate side | Absorption axis direction | | | 45° | | | |

TABLE 1-continued

| | | Red | | Green | | Blue | |
|---|---|---|---|---|---|---|---|
| | | Transmissive region | Reflective region | Transmissive region | Reflective region | Transmissive region | Reflective region |
| Retardation layer in CF substrate | Phase delay axis direction | Not formed | 90° | Not formed | 90° | Not formed | 90° |
| | Δnd | | 150 nm (at 600 nm) | | 140 nm (at 550 nm) | | 115 nm (at 450 nm) |
| Liquid crystal layer | Type | | | Vertical alignment type | | | |
| | Δnd (at 550 nm) | 370 nm | 185 nm | 370 nm | 185 nm | 370 nm | 185 nm |
| Linear polarizing element on TFT substrate side | Absorption axis direction | | | 135° | | | |

Embodiment 2

FIG. 3 is a cross-sectional view schematically showing a configuration of a liquid crystal display device in accordance with Embodiment 2 of the technology disclosed herein. According to the present Embodiment, in the reflective region R, the retardation layer 45b, that is, the retardation layer 45b which produces a retardation of 140 nm between two polarization components oscillating in mutually perpendicular directions of transmissive light having a wavelength of 550 nm, is formed on the red color layer 42R, the green color layer 42G, and the blue color layer 42B. In the polarizer 70 on the CF substrate 100b side, a retardation plate (λ/2 retardation plate) 72 which produces a retardation of 270 nm between two polarization components oscillating in mutually perpendicular directions of transmissive light having a wavelength of 550 nm is additionally formed. That is, the polarizer 70 includes a TAC film (not shown), a λ/2 retardation plate 72, and a linear polarizing element 71, and a TAC film (not shown). The phase delay axis direction of the retardation plate 72 is 30°, and the absorption axis direction of the linear polarizing element 71 is 15°. Other configurations are the same as in Embodiment 1.

The following Table 2 shows parameters of the respective optical members of the liquid crystal display device in accordance with the present Embodiment.

TABLE 2

| | | Red, Green, Blue | |
|---|---|---|---|
| | | Transmissive region | Reflective region |
| Linear polarizing element on CF substrate side | Absorption axis direction | 15° | |
| Retarder on CF substrate side | Phase delay axis direction | 30° | |
| | Δnd (at 550 nm) | 270 nm | |
| Retardation layer in CF substrate | Phase delay axis direction | Not formed | 90° |
| | Δnd (at 550 nm) | | 140 nm |
| Liquid crystal layer | Type | Vertical alignment type | |
| | Δnd (at 550 nm) | 370 nm | 185 nm |
| Linear polarizing element on TFT substrate side | Absorption axis direction | 135° | |

With reference to FIGS. 4(a) to 4(g), production steps of the color filter substrate 100b constituting the liquid crystal display device in accordance with Embodiment 2 are mentioned.

(1) Formation of Color Layer

Figure 4:
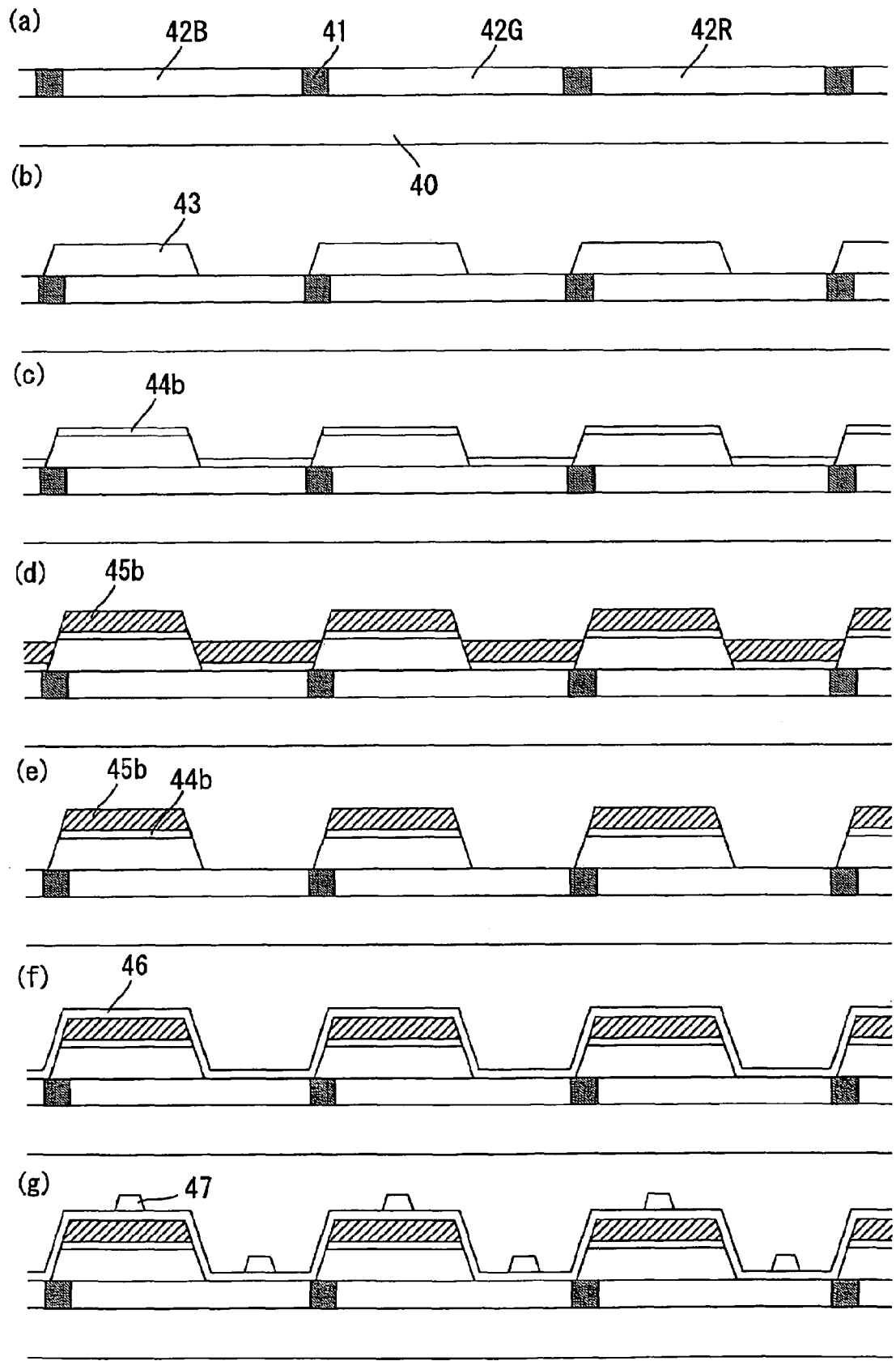
FIGS. 4(a) to 4(g) are cross-sectional views schematically showing production steps of the color filter substrate of the liquid crystal display device in accordance with example Embodiment 2.

First, as shown in FIG. 4(a), two-layer chrom black matrixes (BMs) 41 having a multilayer structure of chrom oxide ($CrO_x$) and chrom (Cr) is formed on a transparent insulating substrate 40 such as a glass substrate. Successively, an acrylic resin with which a red pigment is mixed is coated by spin coating, and patterned by a photolithography process. As a result, a red color layer 42R is formed in some of the spaces between the chrom BMs 41. In the same manner, a green color layer 42G and a blue color layer 42B are also formed.

(2) Formation of Transparent Resin Layer

Then, an acrylic resin is coated on the color layers and patterned by a photolithography process. As a result, a transparent resin layer (insulating layer) 43 is formed as shown in FIG. 4(b). Due to this transparent resin layer 43, a structure in which two regions having different cell thicknesses are formed in one pixel (a dual-gap structure or a multi-gap structure) can be formed.

(3) Formation of Retardation Control Alignment Film

Then, a polyimide film is formed by coating a resin composition in which a polyimide resin is dissolved on the substrate and drying it. Due to this polyimide film, the liquid crystal polymer constituting the retardation layer 45a can be aligned in a specific direction. Then, the polyimide film is rubbed in a specific direction with a metal roller wrapped by rayon, thereby forming a retardation control alignment film 44b, as shown in FIG. 4(c).

(4) Formation and Patterning of Retardation Layer

Then, as shown in FIG. 4(d), a liquid crystal monomer dissolved with a solvent is coated on the substrate by a spin coating method and the like and then exposed to UV irradiation and the like, thereby being polymerized. As a result, a retardation layer 45b is formed. As the liquid crystal monomer, polymerizable nematic liquid crystal represented by the following formulae (6) and (7) may be used, for example. Then, as shown in FIG. 4(e), unnecessary parts of the retardation control alignment film and the retardation layer are removed by photolithography and dry etching.

[Formula 6]

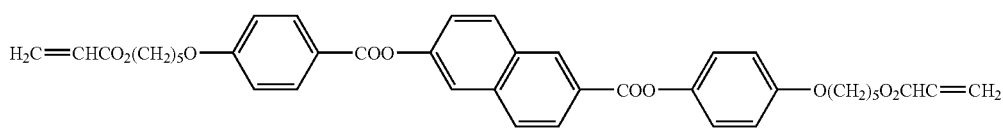

(6)

[Formula 7]

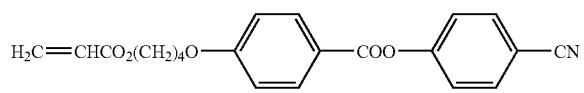

(7)

(5) Formation of Counter Electrode

Then, as shown in FIG. 4(f), indium tin oxide (ITO) is deposited on the substrate, thereby forming a counter electrode 46. The material for the counter electrode 46 is not especially limited, and indium zinc oxide (IZO) also may be used, for example.

(6) Formation of Projection for Liquid Crystal Alignment Control

Finally, a positive phenol novolac photosensitive resin solution is coated on the substrate by a spin coating method and the like, and then dried. The dried resin is exposed and developed using a photomask, thereby forming projections for liquid crystal alignment control 47, as shown in FIG. 4(g). As a result, the CF substrate 100b is completed.

The CF substrate 100b constituting the liquid crystal display device according to Embodiment 1 can be formed, for example, by repeating the above-mentioned steps (3) and (4).

Comparative Embodiment 1

Figure 5:
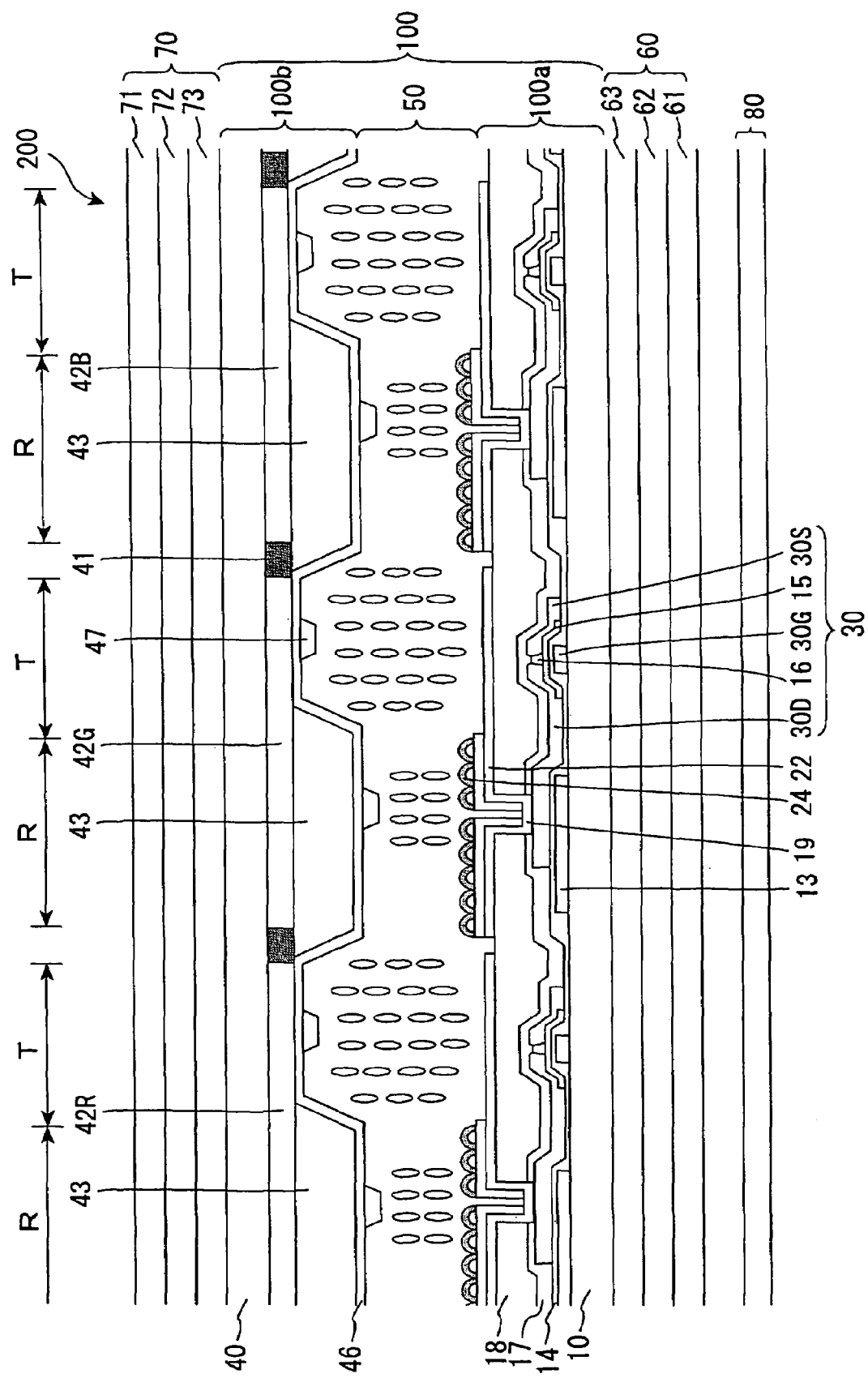
FIG. 5 is a cross-sectional view schematically showing a configuration of the liquid crystal display device in accordance with Comparative Embodiment 1.

FIG. 5 is a cross-sectional view schematically showing a configuration of a liquid crystal display device in accordance with Comparative Embodiment 1.

In the present Comparative Embodiment, no retardation layer is formed in a liquid crystal cell 100. In addition, as a polarizer 60, a linear polarizing element 61, λ/2 retardation plate 62, and a λ/4 retardation plate 63 are stacked in this order from the back face side to the liquid crystal layer side. As a polarizer 70, a λ/4 retardation plate 73, a λ/2 retardation plate 72, and a linear polarizing element 71 are stacked in this order from the back face side to the display face side. The absorption axis direction of the linear polarizing element 61 is 105°. The phase delay axis directions of the λ/4 retardation plate 62 and λ/2 retardation plate 63 are 0° and 120°, respectively. The absorption axis direction of the linear polarizing element 71 is 15°. The phase delay axis directions of the λ/4 retardation plate 72 and the λ/2 retardation plate 73 are 90° and 30°, respectively. Other configurations are the same as in Embodiment 1.

The following Table 3 shows parameters of the respective optical components in the liquid crystal display device in accordance with the present Comparative Embodiment.

TABLE 3

| | | Red, Green, Blue | |
|---|---|---|---|
| | | Transmissive region | Reflective region |
| Linear polarizing element on CF substrate side | Absorption axis direction | 15° | |
| Retarder on CF substrate side | Phase delay axis direction | 30° | |
| | Δ nd (at 550 nm) | 270 nm | |

TABLE 3-continued

| | | Red, Green, Blue | |
|---|---|---|---|
| | | Transmissive region | Reflective region |
| Retarder on CF substrate side | Phase delay axis direction | 90° | |
| | Δ nd (at 550 nm) | 140 nm | |
| Liquid crystal layer | Type | Vertical alignment type | |
| | Δ nd (at 550 nm) | 370 nm | 185 nm |
| Retarder on TFT substrate side | Phase delay axis direction | 0° | |
| | Δ nd (at 550 nm) | 140 nm | |
| Retarder on TFT substrate side | Phase delay axis direction | 120° | |
| | Δ nd (at 550 nm) | 270 nm | |
| Linear polarizing element on TFT substrate side | Absorption axis direction | 105° | |

Comparison in Characteristics Between Embodiments 1 and 2, and Comparative Embodiment 1

Figure 6:
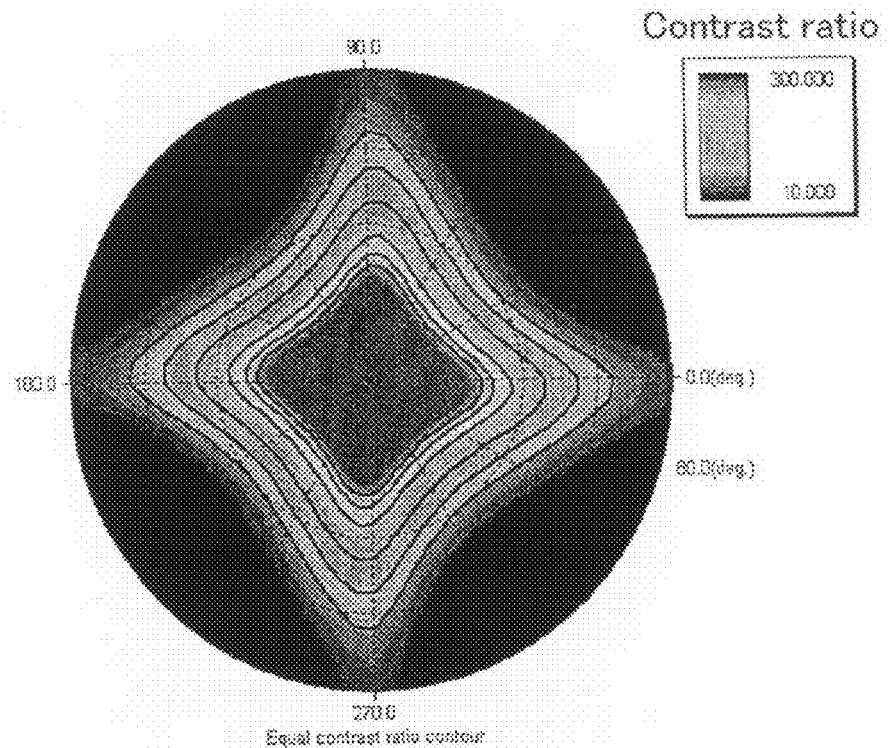
FIG. 6(a) is a diagram showing results of a viewing angle simulation when transmissive display is performed in circular polarization mode.
FIG. 6(b) is a diagram showing results of a viewing angle simulation when transmissive display is performed in linear polarization mode.
Figure 6:
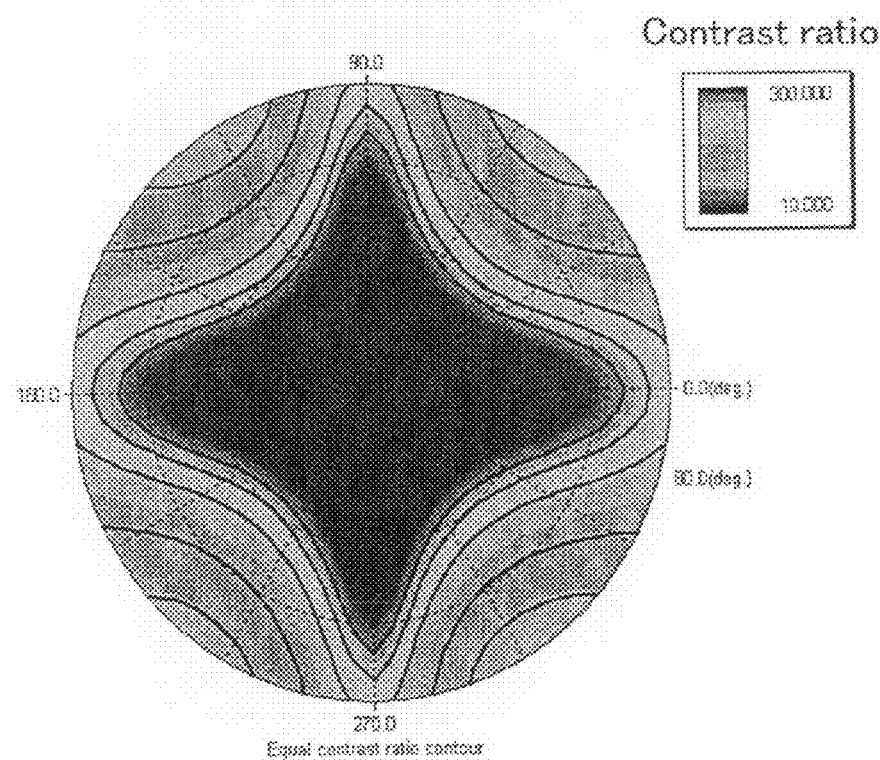

FIG. 6(a) is a diagram showing results of a viewing angle simulation when transmissive display is performed in circular polarization mode. FIG. 6(b) is a diagram showing results of a viewing angle simulation when transmissive display is performed in linear polarization mode. As shown in FIGS. 6(a) and 6(b), a contrast ratio and a viewing angle are significantly reduced when the transmissive display is performed in circular polarization mode, in comparison to the case where the transmissive display is performed in linear polarization mode. In the liquid crystal display device in Comparative Embodiment 1, the λ/4 retardation plate is formed not only in the reflective region R but also in the transmissive region T. Therefore, the transmissive display is performed in circular polarization mode. In contrast, in the liquid crystal display devices in accordance with Embodiments 1 and 2, the retardation layers 45a to 45c which produce a retardation of substantially λ/4 are formed only in the reflective region R, and not formed in the transmissive region T. Therefore, the transmissive display can be performed in linear polarization mode. Accordingly, the liquid crystal display devices in accordance with Embodiments 1 and 2 can perform bright transmissive display in comparison to the liquid crystal display device in accordance with Comparative Embodiment 1.

The λ/4 retardation plates 63 and 73, and the retardation layers 45a to 45c have been known to easily change the retardation by a high-temperature condition and the like and to easily cause uneven luminance. In the liquid crystal display device in accordance with Comparative Embodiment 1, the λ/4 retardation plates 63 and 73 are formed outside of the liquid crystal cell 100. However, in the liquid crystal display devices in accordance with Embodiments 1 and 2, the retardation layers 45a to 45c which produce a retardation of substantially λ/4 are formed in the liquid crystal cell 100. Accordingly, the liquid crystal display devices in accordance with Embodiments 1 and 2 can reduce the above-mentioned generation of uneven luminance, caused by a high-temperature condition, in comparison to the liquid crystal display device in Comparative Embodiment 1.

In addition, in the liquid crystal display device in accordance with Comparative Embodiment 1, as shown in FIG. 5, the λ/4 retardation plate 73 is formed in the polarizer 70 on the CF substrate 100b side in order to perform the reflective display. Therefore, also in the polarizer 60 on the TFT array substrate 100a side, the λ/4 retardation plate 63 is formed in order to simultaneously perform the transmissive display and the reflective display. In contrast, according to the liquid crystal display devices in Embodiment 1 and 2, as shown in FIGS. 1-2 and 3, the retardation layers 45a to 45c which produce a retardation of substantially λ/4 are formed in the CF substrate 100b. Therefore, there is no need to form a λ/4 retardation plate in the polarizer 70 on the CF substrate 100b side. Further, the retardation layers 45a to 45c are formed only in the reflective region R. Therefore, as shown in Comparative Embodiment 1, there is no need to form the λ/4 retardation plate in the polarizer 60 on the TFT array substrate 10a side. That is, according to the liquid crystal display devices in Embodiments 1 and 2, two λ/4 retardation plates can be reduced. Therefore, production costs can be significantly reduced in comparison to the liquid crystal display device in Comparative Embodiment 1.

According to the liquid crystal display device in Embodiment 2, broadband circular polarization is permitted in the reflective region R, due to the combination of retardation layer 45b which produces a retardation of substantially λ/4 with the λ/2 retardation plate formed over the transmissive region T and the reflective region R. In contrast, according to the liquid crystal display device in Embodiment 1, broadband circular polymerization is permitted in the reflective region R because the retardation layers 45a to 45c which produce a retardation of substantially λ/4 each control a retardation corresponding to spectroscopic characteristics of the color layers 42R, 42G, and 42B. Therefore, the liquid crystal display device in Embodiment 1 performs brighter transmissive display because the broadband λ/2 retardation plate is not formed in the transmissive region T.

The present application claims priority under the Paris Convention and the domestic law in the country to be entered into national phase on Patent Application No. 2005-350019 filed in Japan on Dec. 2; 2005, the entire contents of which are hereby incorporated by reference.

The terms "or more" and "or less" in the present description mean that the described value is included. That is, the term "or more" means that the described value and values higher than the described value are included.

EXPLANATION OF NUMERALS AND SYMBOLS

| | |
|---|---|
| 10, 40: | Transparent insulating substrate |
| 11: | Gate wiring |
| 12: | Source wiring |
| 13: | Storage capacitor wiring |
| 14: | Gate insulating film |
| 15: | Semiconductor layer |
| 16: | Channel protective layer |
| 17: | Protective insulating film |
| 18: | Interlayer insulating Film |

-continued

| | |
|---|---|
| 19: | Contact hole |
| 22: | Transparent electrode |
| 24: | Reflective electrode (light black part) |
| 30: | Thin film transistor (TFT) |
| 30G: | Gate electrode |
| 30D: | Drain electrode |
| 30S: | Source electrode |
| 41: | Black matrix (dark black part) |
| 42B: | Blue color layer |
| 42G: | Green color layer |
| 42R: | Red color layer |
| 43: | Transparent resin layer (insulating layer) |
| 44a to 44c: | Retardation control alignment film |
| 45a: | Retardation layer (netted part) |
| 45b: | Retardation Layer (shaded part) |
| 45c: | Retardation Layer (dotted part) |
| 46: | Counter electrode |
| 47: | Projection for liquid crystal alignment |
| 50: | Liquid crystal layer |
| 60, 70: | Polarizer |
| 61, 71: | Linear polarizing element |
| 62, 72: | λ/2 Retardation plate |
| 63, 73: | λ/4 Retardation plate |
| 80: | Backlight |
| 100: | Liquid crystal cell |
| 100a: | Thin film transistor (TFT) array substrate |
| 100b: | Color filter (CF) substrate |
| 200: | Liquid crystal display device |
| R: | Reflective region (light black part) |
| T: | Transmissive region |

The invention claimed is:

1. A liquid crystal display device comprising a structure in which a first substrate including a reflective layer, a liquid crystal layer, a second substrate, and a polarizer are stacked in this order from a back face to a display face, wherein the liquid crystal display device includes a retardation layer, in a region on a liquid crystal layer side of the reflective layer of the first substrate, or in a region where the reflective layer is not arranged of the first substrate, or in the second substrate, and the retardation layer provides two or more regions having different retardations in a display surface plane;

wherein the liquid crystal display device includes a reflective region where the reflective layer is arranged and a transmissive region where the reflective layer is not arranged, and the retardation layer provides retardations different between the reflective region and the transmissive region;

wherein, in the reflective region, the retardation layer produces a retardation of substantially λ/4 between polarization components of light, the light having a wavelength of λ and entering from a direction substantially vertical to the retardation layer;

wherein the first substrate or the second substrate includes two or more color layers having different dominant wavelengths in the region on the liquid crystal layer side of the reflective layer, the retardation layer produces a retardation of substantially $\lambda_A/4$ between polarization components of light, the light having a wavelength of $\lambda_A$ and entering from a direction substantially vertical to the retardation layer, in a reflective region where the two or more color layers are arranged, and the polarizer includes a retardation plate which produces a retardation of substantially $\lambda_A/2$ between polarization components of light, the light having a wavelength of $\lambda_A$ and entering from a direction substantially vertical to the retardation plate.

2. A liquid crystal display device comprising a structure in which a first substrate including a reflective layer, a liquid crystal layer, a second substrate, and a polarizer are stacked in this order from a back face to a display face, wherein the liquid crystal display device includes a retardation layer, in a region on a liquid crystal layer side of the reflective layer of the first substrate, or in a region where the reflective layer is not arranged of the first substrate, or in the second substrate, and the retardation layer provides two or more regions having different retardations in a display surface plane;

wherein the liquid crystal display device includes a reflective region where the reflective layer is arranged and a transmissive region where the reflective layer is not arranged, and the retardation layer provides retardations different between the reflective region and the transmissive region;

wherein, in the reflective region, the retardation layer produces a retardation of substantially $\lambda/4$ between polarization components of light, the light having a wavelength of $\lambda$ and entering from a direction substantially vertical to the retardation layer;

wherein the first substrate or the second substrate includes two or more color layers having different dominant wavelengths in the region on the liquid crystal layer side of the reflective layer, the retardation layer produces a retardation of substantially $\lambda_B/4$ between polarization components of light, the light having a wavelength of $\lambda_B$ and entering from a direction substantially vertical to the retardation layer, in a reflective region where a color layer having a dominant wavelength of $\lambda_B$ is arranged, and the retardation layer produces a retardation of substantially $\lambda_C/4$ between polarization components of light, the light having a wavelength of $\lambda_C$ and entering from a direction substantially vertical to the retardation layer, in a reflective region where a color layer having a dominant wavelength of $\lambda_C$ ($\lambda_C \neq \lambda_B$) is arranged.

3. A liquid crystal display device comprising a structure in which a first substrate including a reflective layer, a liquid crystal layer, a second substrate, and a polarizer are stacked in this order from a back face to a display face, wherein the liquid crystal display device includes a retardation layer, in a region on a liquid crystal layer side of the reflective layer of the first substrate, or in a region where the reflective layer is not arranged of the first substrate, or in the second substrate, and the retardation layer provides two or more regions having different retardations in a display surface plane;

wherein the liquid crystal display device includes a reflective region where the reflective layer is arranged and a transmissive region where the reflective layer is not arranged, and the retardation layer provides retardations different between the reflective region and the transmissive region;

wherein, in the reflective region, the retardation layer produces a retardation of substantially $\lambda/4$ between polarization components of light, the light having a wavelength of $\lambda$ and entering from a direction substantially vertical to the retardation layer;

wherein the first substrate or the second substrate includes two or more color layers having different dominant wavelengths in the region on the liquid crystal layer side of the reflective layer, and the retardation layer has reverse wavelength dispersion characteristics.

* * * * *